United States Patent
Fujii et al.

(10) Patent No.: US 12,353,343 B2
(45) Date of Patent: Jul. 8, 2025

(54) SEMICONDUCTOR DEVICE INCLUDING ARRAY OF PROCESSOR ELEMENTS AND METHOD OF CONTROLLING THE SAME

(71) Applicant: RENESAS ELECTRONICS CORPORATION, Tokyo (JP)

(72) Inventors: Taro Fujii, Tokyo (JP); Teruhito Tanaka, Tokyo (JP); Katsumi Togawa, Tokyo (JP); Takao Toi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 4 days.

(21) Appl. No.: 17/065,169

(22) Filed: Oct. 7, 2020

(65) Prior Publication Data
US 2021/0117352 A1 Apr. 22, 2021

(30) Foreign Application Priority Data
Oct. 16, 2019 (JP) ................................. 2019-189601

(51) Int. Cl.
*G06F 15/80* (2006.01)
*G06F 13/28* (2006.01)
*G06F 15/16* (2006.01)

(52) U.S. Cl.
CPC .............. *G06F 13/28* (2013.01); *G06F 15/16* (2013.01); *G06F 15/80* (2013.01); *G06F 2213/28* (2013.01)

(58) Field of Classification Search
CPC ................................. G06F 15/80; G06N 3/063
See application file for complete search history.

(56) References Cited

U.S. PATENT DOCUMENTS

| | | | |
|---|---|---|---|
| 5,596,518 A | 1/1997 | Toyokura et al. | |
| 8,327,187 B1 * | 12/2012 | Metcalf ................. | H04L 49/109 714/10 |
| 8,359,462 B1 * | 1/2013 | Khan .................. | G06F 9/30189 712/34 |
| 8,447,957 B1 * | 5/2013 | Carrillo ............... | G06F 13/1684 712/225 |
| 10,678,479 B1 * | 6/2020 | Diamant ................ | G06N 3/063 |
| 2001/0018733 A1 | 8/2001 | Fujii et al. | |
| 2003/0126404 A1 | 7/2003 | Anjo et al. | |
| 2004/0078093 A1 | 4/2004 | Fujii et al. | |

(Continued)

FOREIGN PATENT DOCUMENTS

| JP | H08-185389 A | 7/1996 |
|---|---|---|
| JP | 2001-312481 A | 11/2001 |

(Continued)

OTHER PUBLICATIONS

Notice of Reasons for Refusal issued in corresponding Japanese Patent Application No. 2019-189601, dated Mar. 14, 2023, with English translation.

*Primary Examiner* — Jacob Petranek
(74) *Attorney, Agent, or Firm* — Rimon P.C.

(57) ABSTRACT

A semiconductor device includes a data path having a plurality of processor elements, a state transition management unit managing a state of the data path, and a parallel computing unit in which an input and an output of data is sequentially carried out, and an output of the parallel computing unit is capable of being handled by the plurality of processor elements.

9 Claims, 33 Drawing Sheets

(56) References Cited

U.S. PATENT DOCUMENTS

| | | | |
|---|---|---|---|
| 2005/0050233 A1 | 3/2005 | Anjo et al. | |
| 2019/0042923 A1* | 2/2019 | Janedula | G06N 3/044 |
| 2019/0079801 A1* | 3/2019 | Lyuh | G06N 3/0454 |
| 2019/0236049 A1* | 8/2019 | Vantrease | G06N 3/02 |
| 2019/0294413 A1* | 9/2019 | Vantrease | G06F 7/5095 |
| 2020/0073470 A1* | 3/2020 | Ernewein | G06F 1/324 |
| 2020/0089506 A1* | 3/2020 | Power | G06F 9/3897 |
| 2021/0011288 A1* | 1/2021 | Lai | G02B 27/0093 |
| 2021/0157548 A1* | 5/2021 | Elmer | G06N 3/063 |

FOREIGN PATENT DOCUMENTS

| | | |
|---|---|---|
| JP | 2003-196246 A | 7/2003 |
| JP | 2004-133780 A | 4/2004 |
| JP | 2005-078177 A | 3/2005 |
| JP | 2012-226578 A | 11/2012 |

\* cited by examiner

FIG. 8

FIRST ROW DATA OF MATRIX DATA In (m=20)

$$\begin{pmatrix} b_0 & b_1 & \cdots & b_{19} \end{pmatrix}$$

×

MATRIX DATA W (m=20, n=20)

$$\begin{pmatrix} a_{0,0} & a_{0,1} & \cdots & a_{0,19} \\ a_{1,0} & a_{1,1} & \cdots & a_{1,19} \\ a_{19,0} & a_{19,1} & \cdots & a_{19,19} \end{pmatrix}$$

=

$$\begin{pmatrix} (a_{0,0} \times b_0) + (a_{1,0} \times b_1) + \cdots a_{19,0} \times b_{19} \end{pmatrix} \quad (a_{0,1} \times b_0) + (a_{1,1} \times b_1) + \cdots a_{19,1} \times b_{19}) \quad \cdots \quad (a_{0,19} \times b_0) + (a_{1,19} \times b_1) + \cdots a_{19,19} \times b_{19})$$

SEMICONDUCTOR DEVICE INCLUDING ARRAY OF PROCESSOR ELEMENTS AND METHOD OF CONTROLLING THE SAME

CROSS-REFERENCE TO RELATED APPLICATIONS

The disclosure of Japanese Patent Application No. 2019-189601 filed on Oct. 16, 2019 including the specification, drawings and abstract is incorporated herein by reference in its entirety.

BACKGROUND

The present invention relates to a semiconductor device and its control method, for example, to a semiconductor device having a plurality of processor elements (hereinafter, also called PE) and its control method.

There is a dynamically reconfigurable processor (DRP, hereinafter, also called array type processor) as a processor having a plurality of PEs. The array type processor can dynamically switch operation contents carried out by the PEs and inter-PE etc. connection, and can dynamically reconfigure a configuration of the array type processor.

There is a disclosed technique listed below.
[Patent Document 1] Japanese Unexamined Patent Application Publication No. 2001-312481).

SUMMARY

After evaluating a technique earlier, the inventors of the present invention have found what there is room to further improve the technique from the viewpoint of flexibility etc. The other problems and novel features will become apparent from the descriptions of the present specification and the accompanying drawing. Incidentally, Patent Document 1 discloses a technique of an array type processor, but does not disclose an array type processor superior in flexibility while it maintains high operation performance.

A semiconductor device according to one embodiment is as follows.

In other words, a semiconductor device includes: a data path with a plurality of processor elements; a state transition management unit that manages a state related to a configuration of the data path; and a parallel computing unit in which an input and an output of data are sequentially executed, the output and/or input of the parallel computing unit are processed by the plural processor elements.

According to the one embodiment, the semiconductor device and its control method can be provided, the semiconductor device being capable of securing the flexibility of the processing contents while maintaining the high operation performance.

BRIEF DESCRIPTION OF THE DRAWINGS

FIG. 8 is a view showing the matrix operation expression.

DETAILED DESCRIPTION

Figure 1:
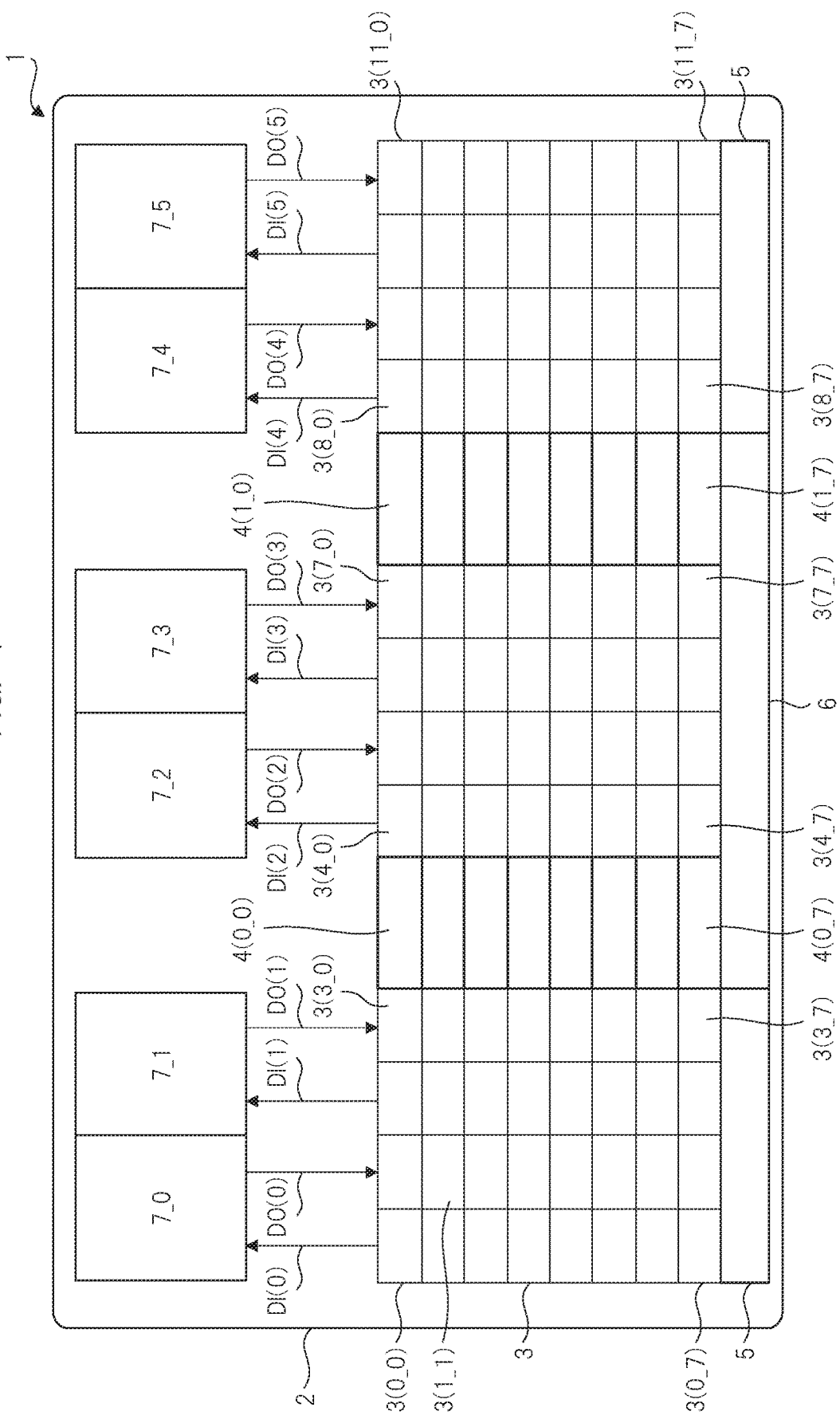
FIG. 1 is a block diagram showing a configuration of a semiconductor device according to a first embodiment.

Hereinafter, embodiments of the present invention will be described in detail with reference to the accompanying drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention.

In addition, the same reference characters are applied to the same elements as those described in relation to the foregoing drawings in the present specification and the respective drawings, and detailed descriptions thereof will be appropriately omitted in some cases.

Hereinafter, a semiconductor device suitable for a deep learning processing and its control method will be explained as an example. However, the deep learning processing is one example, and the semiconductor device and its control method that will be explained below may perform a large-scale arithmetic processing etc.

First Embodiment (Configuration of Semiconductor Device)

FIG. 1 is a block diagram showing a configuration of a semiconductor device according to a first embodiment. In FIG. 1, the reference numeral 2 shows an array type processor mounted on a semiconductor device 1. A circuit block(s) other than the array type processor 2 is also mounted on the semiconductor device 1, but is omitted in the same figure.

The array type processor 2 comprises: an array 3 of a PE; a plurality of arithmetic circuits 4(0_0) to 4(0_7) and 4(1_0) to 4(1_7); a circuit block 5; a state transition management unit 6; and a plurality of parallel computing units 7_0 to 7_5. A plurality of PE 3(0_0) to 3(7_11) are arranged on the array 3 in array form. In addition, the plural arithmetic circuits 4(0_0) to 4(0_7) and 4(1_0) to 4(1_7) are not limited in particular, but are arranged along a row of the array 3. The arithmetic circuits 4(0_0) to 4(1_7) may be circuits for realizing different functions or circuits for realizing the same function. For example, the arithmetic circuits 4(0_0) to 4(1_7) may be multiplication circuits and/or subtraction circuits, etc.

Provided as the circuit block 5 are, for example, a storage circuit (memory) and a DMAC (Direct Memory Access Controller).

In FIG. 1, although being omitted, a plurality of data buses and a plurality of programmable switches (hereinafter, also called P-SW) are connected, in the array 3, between the data buses and the PE 3(0_0) to 3(7_11), between the data buses and the arithmetic circuits 4(0_0) to 4(0_7), and between the data buses and the circuit block 5. Although being explained later by using FIG. 4, an on/off of the P-SW is controlled, for example, by a switch control signal from the corresponding PE (e.g., 3(1_1)).

The state transition management unit 6 manages the PE 3(0_0) to 3(7_11). In other words, the state transition management unit 6 designates (appoints) the operation contents carried out by each of the PE 3(0_0) to 3(7_11), and designates a state of the P-SW corresponding to each of the PE 3(0_0) to 3(7_11). For example, the state transition management unit 6 designates the operation contents carried out by the PE 3(1_1), and designates the on/off of the P-SW corresponding to the PE 3(1_1) with respect to the PE 3(1_1).

Similarly, the state transition management unit 6 manages the arithmetic circuits 4(0_0) to 4(1_7), the circuit block 5, and the parallel computing units 7_0 to 7_5. For example, the state transition management unit 6 controls the on/off of the P-SW provided between each of the arithmetic circuit 4(0_0) to 4(1_7), circuit block 5 and parallel computing units 7_0 to 7_5 and the data bus.

In the first embodiment, a data path is configured by the PE 3(0_0) to 3(7_11), the plural data buses, the arithmetic circuits 4(0_0) to 4(1_7), the circuit block 5, the state transition management unit 6, and the plural P-SW. Since the operation contents of the PE 3(0_0) to 3(7_11) and a state of the P-SW connected between the data bus and each circuit are designated by the state transition management unit 6, a state to be concerned with a configuration of the data path will be prescribed by designation of the state transition management unit 6. In other words, the configuration of the data path will be changed (modified) by the state transition management unit 6 changing the designation with the lapse of time.

Each of the parallel computing units 70 to 7_5 includes one input line group and one output line group. This input line group and output line group are connected to the data bus through the corresponding P-SW. Although being not limited in particular, the parallel computing units 7_0 to 7_5 mutually have almost the same configuration. When the parallel computing unit 70 is described as an example, each of the one parallel input line group DI(0) and the one output line group DO(0) of the parallel computing unit 7_0 is connected to the data bus provided in the data path through the P-SW that is controlled by a switch control signal.

FIG. 1 shows an example in which one parallel computing unit has one input line group and one output line group, but a configuration of the one parallel computing unit is not limited to this. For example, one parallel computing unit may have one input line group and one output line group. This makes it possible to perform an output earlier than an input. In other words, with respect to one piece of data of the one input line group, i pieces of data of the output line group can be taken out from the one parallel computing unit in parallel, and the takeout of the output can be speed up at 1/i. Described has been an example in which the number of output line groups provided to the one parallel computing unit is two or more. However, off course, the number of input line groups may be two or more.

The one input line group DO(0) and the one output line group DI(0) shows line groups that transfer, in parallel, data of a plurality of bits to be handled (processed) as one unit. Although an example is explained later, the number of bits to be handled as one unit is 16 bits, and the one input line group DO(0) and the one output line group DI(0) transfer 16-bit wide data. For example, when the number of output line groups which the one parallel computing unit has is changed to two, each of them can take out two pieces of 16-bit wide data from the one parallel computing unit.

In addition, as explained later, the one parallel computing unit includes a plurality of product-sum operation units, and its product-sum operation is performed in parallel. The number of input line groups and output line groups that the one parallel computing unit has is sufficiently smaller than a value of an arithmetic width of the product-sum operation carried out by the product-sum operation unit that the parallel computing unit has.

(Parallel Computing Unit)

Figure 2:
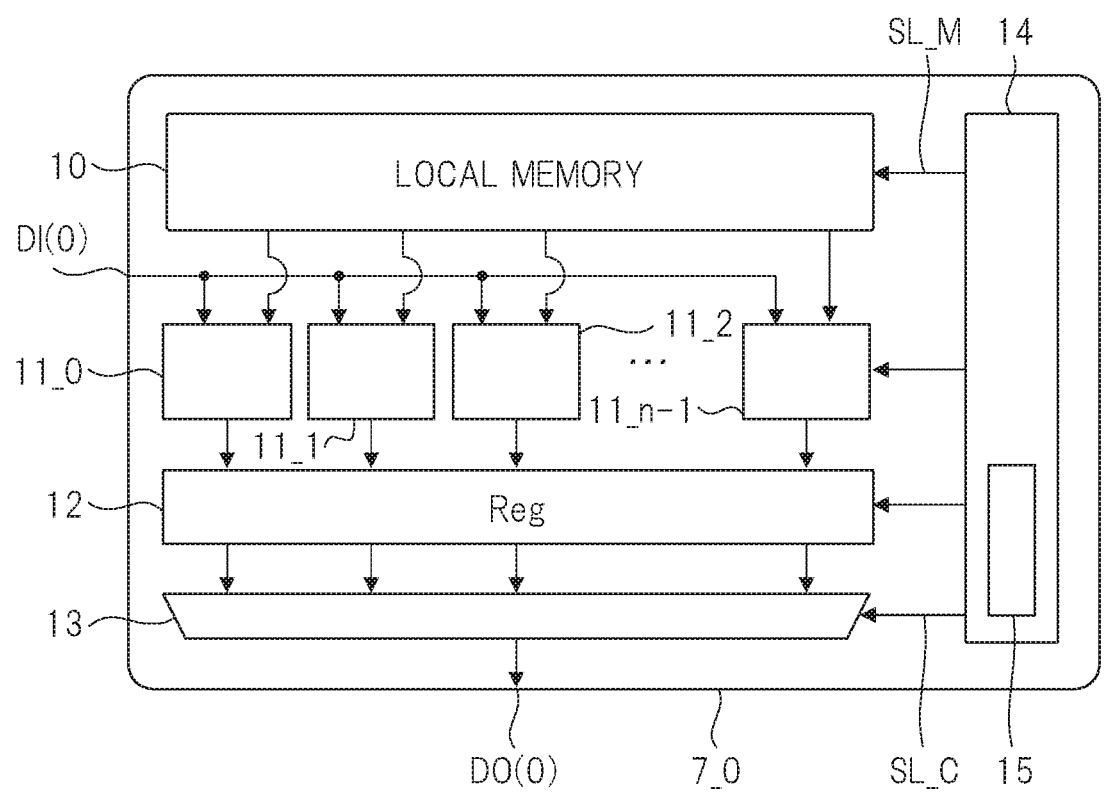
FIG. 2 is a block diagram showing a configuration of a parallel computing unit according to the first embodiment.

FIG. 2 is a block diagram showing a configuration of the parallel computing unit according to the first embodiment. The FIG. shows the configuration of the parallel computing unit 7_0 showed in FIG. 1. The remaining parallel computing units 7_1 to 7_5 are similar, too.

The parallel computing unit 7_0 includes: a local memory 10; n product-sum operation units (Multiply-Accumulate: MAC) 11_0 to 11_$n$-1; a register 12; a selector 13; and a control unit 14. The product-sum operation unit 11_0 includes two input terminal groups and one output terminal group. One input terminal group of the product-sum operation unit is connected to the input line group DI(0), and output data from the local memory 10 is supplied to the other input terminal group. The product-sum operation unit 11_0 performs a product operation between the output data from the local memory and input data from the input line group DI(0), seeks an accumulation (sum operation) of operational results obtained from the product operation, and outputs it from the output terminal group. The remaining product-sum operation units 11_1 to 11_$n$-1 is similar, too. The present embodiment has explained an example in which the parallel computing unit 7_0 has the n product-sum operation unit, but each of the product-sum operation units may be an operation unit capable of performing an operation of only multiplication or addition.

A product-sum operation result outputted from the output terminal groups of the product-sum operation units 11_0 to 11_$n$-1 is stored in the register 12 and is supplied to a selector 13. According to a control signal SL-C from the control unit 14, the selector 13 sequentially selects the product-sum operation result outputted from the product-sum operation units 11_0 to 11_$n$-1, and supplies it to the output line group DO(0).

The control unit 14 controls the local memory 10, the product-sum operation units 11_0 to 11_$n$-1, the register 12, and the selector 13. Although being not limited in particular, the control unit 14 has a counter 15. The selector 13 is controlled by the control signal SL-C formed through the counter 15. In other words, the selector 13 selects an output of the product-sum operation unit identified by the control signal SL-C from among the product-sum operation unit 11_0 to 11_$n$-1, and outputs it to the output line group DO(0). The control signal SL-C is updated sequentially by, for example, the counter counting up, and the selector 13 leads to sequentially outputting the product-sum operation result from the product-sum operation units 11_0 to 11_$n$-1. In addition, control unit 14 forms a control signal SL-M identifying an address of the local memory 10. For example, the control unit 14 forms a control signal SL-M based on an output of the counter 15. In this way, data stored in a different address is sequentially supplied to the product-sum operation units 110 to 11_$n$-1 from the local memory 10.

The parallel computing unit usually inputs double data, and outputs one-time data. In other words, the parallel computing unit inputs two vectors, and outputs one vector. That is, the normal parallel computing unit has two input terminal groups and one output terminal group, and carries out an operation between two pieces of data supplied to two input terminal groups, and outputs its result from the one output terminal group. In contrast, the parallel computing unit 7_0 according to the first embodiment becomes one-input and one-output (one input terminal group and one output terminal group). Namely, the parallel computing unit 7_0 is configured so that one input terminal groups of the product-sum operation units 11_0 to 11_$n$-1 are commonly connected to the input line group DI(0) corresponding to the input terminal group of the parallel computing unit 7_0, while individual pieces of data are supplied to the other input terminal groups of the product-sum operation units 11_0 to 11_$n$-1 from the local memory 10.

In addition, the result of the product-sum operation selected by the selector 13 from among the results of the plural product-sum operations maintained in the register 12 leads to being outputted to the output line group DO(0) corresponding to the output terminal group of the parallel computing unit 7_0.

The input line group DI(0) and the output line group DO(0) of the parallel computing unit 7_0 are connected to the data path through the P-SW. Therefore, the data formed in the data path are supplied to the parallel computing unit 7_0 one by one, and the product-sum operation result formed by the parallel computing unit 7_0 leads to being supplied to the data path one by one.

In addition, in the configuration shown in FIG. 2, the register 12 is connected between the product-sum operation units 11_0 to 11_$n$-1 and the selector 13, and the product-sum operation results are stored in the register 12. Consequently, this makes it possible to carry out temporally and in parallel an input processing and a product-sum operation processing of data to the product-sum operation unit 11_0 to 11_$n$-1 and a processing for outputting the product-sum operation result from the parallel computing unit 7_0. In other words, a pipeline operation can be carried out. Performance of the pipeline operation makes it possible to improve efficiency of the processings.

As described above, the parallel computing unit 7_0 has been explained as an example, but the remaining parallel computing units 7_1 to 7_$n$-1 are similar, too.

FIG. 2 shows a case where each of the number of inputs and the number of outputs of the parallel computing unit is one, but the present embodiment is not limited to this case. For example, the number of inputs and outputs of the parallel computing unit may sufficiently be smaller than the number of product-sum operation units 11_0 to 11_$n$-1 included in the parallel computing unit 7_0. For example, the number of inputs and outputs of the parallel computing unit 7_0 may be two or four. In this case, if the product-sum operation units 11_0 to 11_$n$-1 are divided into two groups of two or four units and are connected to a common input line group for each group, the number of inputs may be set to two or four. In addition, the number of outputs may be set to two or four by dividing the output line group outputting the product-sum operation result for each group. Furthermore, the number of outputs may be different from the number of inputs. Incidentally, data from the local memory 10 is supplied to the one input terminal groups of the product-sum operation units 11_0 to 11_$n$-1 even when the number of inputs and outputs is set to two or more in this way.

In addition, in FIG. 2, the parallel computing unit that uses the register 12 has been explained as an example, but the register 12 may be omitted. The omission of the register 12 makes it possible to achieve downsizing of the unit.

(Processing Example of Parallel Computing Unit)

Next, a processing example of the parallel computing unit will be explained by using the parallel computing unit 7_0 as an example. Here, explained will be a case where k pieces of data are supplied to the parallel computing unit 70 and its m operation results are outputted. In addition, it is assumed that the processing of the parallel computing unit 70 is repeated the predetermined number of times (e.g., i times).

At first, the control unit 14 initializes registers (not illustrated) in the product-sum operation units 11_0 to 11_n−1. In this initialization, set in each register is, for example, "0" or an initial value that is stored in a memory such as the local memory 10.

Sequentially, the input data DI (0) supplied to the parallel computing unit 70 is distributed to each of the product-sum operation units 11_0 to 11_n−1 at the same time. In this time, data stored in an address (e.g., head address) of the local memory 10 that is designated by the control unit 14 is supplied to each of the product-sum operation unit 11_0 to 11_n−1. The product-sum operation units 11_0 to 11_n−1 carry out the product operations between the distributed input data and the data supplied from the local memory 10 at the same time. The product operation result demanded by the product operations is added together with the initial value that is maintained by (in) a register, and the addition result is written in the register again.

The next input data supplied to the parallel computing unit 7_0 is distributed to each of the product-sum operation units 11_0 to 11_n−1 at the same time. In addition, at this time, data stored in the next address in the local memory 10 that is designated by the control unit 14 is supplied to each of the product-sum operation units 11_0 to 11_n−1. The product-sum operation units 11_0 to 11_n−1 carry out the product operations between the distributed input data and the data supplied from the local memory 10 at the same time. The product operation result obtained by the product operations is added together with the former addition result that is maintained by the register. The addition result of this time is written in the register again.

By repeating this k times, the product-sum operations with the serial product-sum operation units 11_0 to 11_n−1 are performed, and the m product-sum results are obtained. Then, the control unit 14 causes the m product-sum operation results to be transferred to the register 12. The counter 15 designates one from the m product-sum operation results stored in the register 12. The designated product-sum operation result is selected by the selector 13 and is outputted. The m product-sum operation results are outputted sequentially by the counter 15 by repeating m times an operation for designating the different product-sum operation result.

The control unit 14 may cause the next product-sum operation to start concurrently with the output of the product-sum operation result.

The control unit 14 repeats i times the above-mentioned processing, i.e., a series of processings of setting the initial value to the register, sequentially reading the data from the head address of the local memory 10, and causing the product-sum operation to be performed between the input data and the local memory 10, thereby completing the processing. Here, an example of sequentially reading the data from the head address of the local memory 10 has been mentioned, but the present embodiment is not limited to this. For example, when the reading up to a predetermined address of the local memory 10 is performed in the processing before performing the above-mentioned product-sum operation, the next address of the predetermined address is regarded as the above-mentioned head address and the data may be read sequentially.

Incidentally, the control unit 14 may work based on information from the state transition management unit 6, and the state transition management unit 6 may work as the control unit 14. In addition, the control unit 14 may be common to the plural parallel computing units.

Furthermore, the control unit 14 may be configured by a data path including the PE etc. Since a configuration of the data path is defined by the state transition management unit 6, the control signals SL_C and SL_M can be made programmable. Consequently, made programmable can be, for example, order of the data read from the local memory 10, order of the selection by the selector 13, and the like.

In the following explanation for making it easier, when the parallel computing units 7_0 to 7_5 are collectively mentioned, they will be explained as the parallel computing unit 7. In addition, when the product-sum operation units 11_0 to 11_n−1 are collectively mentioned, the reference numeral 11 will be used. when the PE 3(0_0) to 3(7_11) are collectively mentioned, they will be explained as the PE 3( ).

(State Transition Management Unit)

Figure 3A:
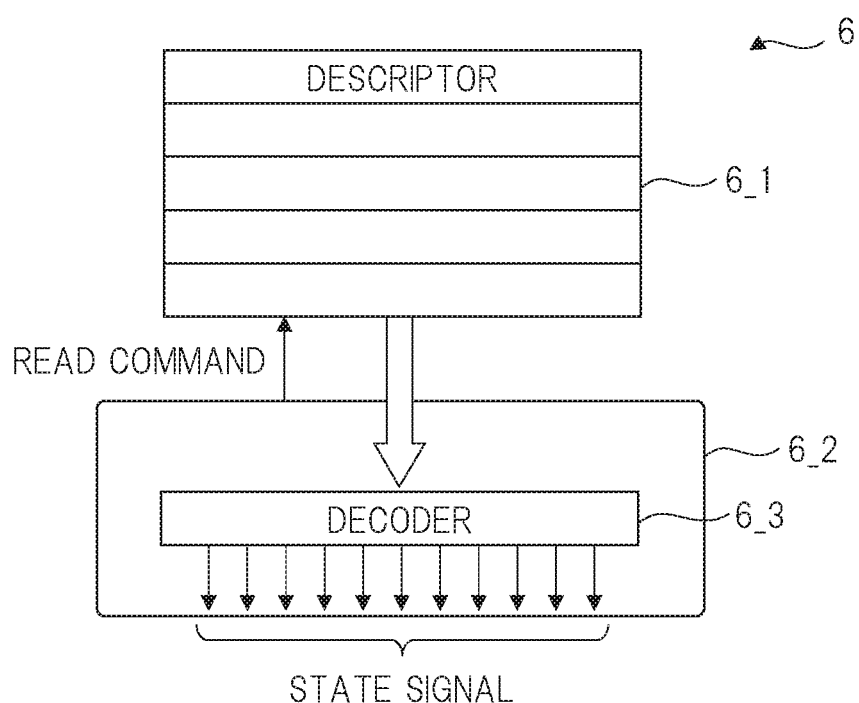
FIG. 3A is a block diagram for explaining a state transition management unit according to the first embodiment.
Figure 3B:
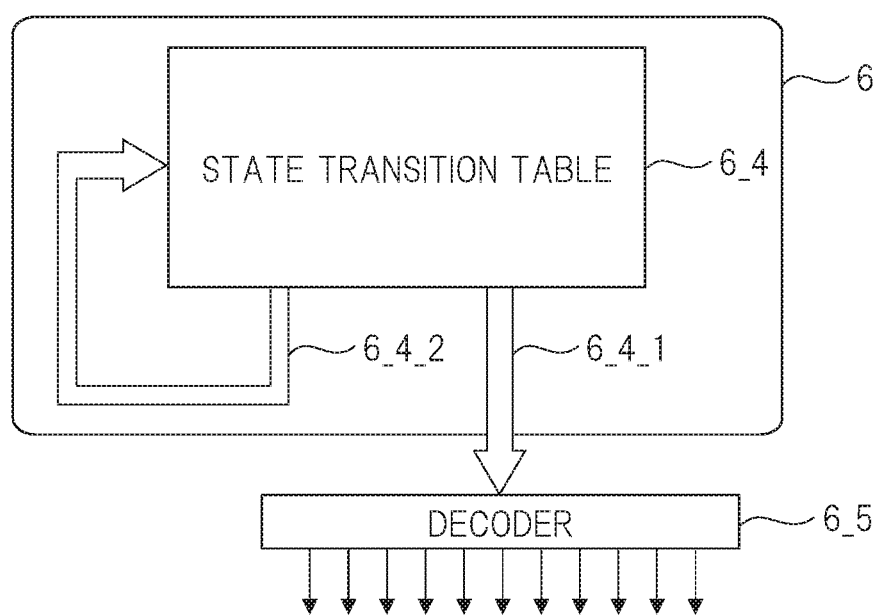
FIG. 3B is a block diagram for explaining a state transition management unit according to the first embodiment.

FIG. 3 is a block diagram for explaining a state transition management unit according to the first embodiment. Here, configurations of two kinds of state transition management units will be explained. FIG. 3A shows a state transition management unit having a configuration of using a memory, and FIG. 3B shows a state transition management unit having a configuration of using a condition transition table.

The state transition management unit 6 shown in FIG. 3A includes a memory 6_1 and a management unit 6_2. Furthermore, the management unit 6_2 includes a decoder 6_3. A plurality of descriptors are stored in the memory 6_1 in advance. The management unit 6_2 designates an address in the memory 6_1, issues a read command, reads the descriptor from the memory 6_1, and decodes the read descriptor by a decoder 6_3. The management unit 6_2 supplies, to the PE 3( ) and the P-SW, etc., a state signal obtained from the decoding by the decoder 6_3.

Each of the descriptors is formed by a bit string that prescribes (defines) a state of an operation of the data path, and a state signal indicating the operation state of the data path is formed by the decoding. By the supplied state signal, operation contents of PE 3( ) and a state of the P-SW is designated, and a state of the configuration of the data path leads to being prescribed.

The management unit 6_2 sequentially designates a different address in the memory 6_1, and issues a read command. Consequently, the state of the data path leads to being sequentially transitioned.

The memory 6_1 is configured by a memory that is located outside the array type processor 2 shown in FIG. 1, but is not limited to this. For example, it may be a memory in the circuit block 5 shown in FIG. 1 or a memory provided outside the semiconductor device 1.

A state transition management unit 6 shown in FIG. 3B includes a state transition table 6_4. The state transition table 6_4 outputs designation information 6_4_1 for designating the operation contents of PE 3( ) and the state of the P-SW, and address information 6_4_2 for designating a next address in the state transition table 6_4. In the state transition management unit 6 of FIG. 3B, each of the PE 3( ) includes a decoder 6_5. For example, the PE 3(0_0) decodes the designation information 6_4_1 from the state transition management unit 6 by the decoder 6_5. Based on a signal obtained by this decode, the PE 3(0_0) determines operation contents of its own and a state of the corresponding P-SW. In other words, the designation information 6_4_1 is a bit string for prescribing the operation contents of PE 3( ) and the state of the P-SW.

Since the next address in the state transition table 6_4 is designated by the address information 6_4_2, next designation information 6_4_1 and the address information 6_4_2 are read from the designated address. Consequently, the state of the data path leads to being sequentially transitioned.

Which of the state transition management units 6 shown in FIGS. 3A and 3B is used is desirably determined according to the number of contents designated for each state of the data path by, for example, considering a circuit scale and a complexity. For example, it is desirable in the state of the data path to use the configuration shown by FIG. 3A when the designated contents are light and to use the configuration shown by FIG. 3B when the designated contents are heavy.

(Frequency of State Transition)

As shown in FIG. 2, the parallel computing units 7_0 to 7_5 have the product-sum operation units 110 to 11_$n$–1, and obtain the results of the product-sum operations by inputting a large number of data. The results of the product-sum operations are taken out one by one by the selector 13. It appears that a large number of cycles is required for the input and output of the data in order to take out it one by one. It is desired in those cycles to fix the configuration of the data path without changing it.

For example, it is usually desired for the state transition management unit 6 to work (run) so as to sometimes change configuration of the data path without changing the configuration of the data path. In this case, a period of using the parallel computing units 7_0 to 7_5 is regarded as a normal period, and the state transition management unit 6 works so as to maintain the configuration of the data path. Meanwhile, in transitioning in the period of not using the parallel operation units 7_0 to 7_5, the state transition management unit 6 works so as to change the configuration of the data path. In this case, even when time required for changing the configuration of the data path becomes a little long, lengthening time required for the processing can be suppressed if the data path and the state transition management unit 6 are configured so as to increase an operation frequency, for example, so as to shorten the configuration of the data path in the period in which the configuration of the data path is fixed.

In addition, since the input and output of the parallel computing units 7_0 to 7_5 according to the first embodiment are performed sequentially, the data is inputted by multiplying a multi-cycle and the data is outputted by multiplying a multi-cycle. In this case, if the state of the data path is transitioned at one cycle or changed in one cycle, efficiency decreases very much. Therefore, for example, the transition of the state and the change of the configuration of the data path are carried out by multiplying the multi-cycle, and it is desired to achieve the downsizing of the circuit scale and the speedup of the operation frequency. This will be explained by using, as an example, a case of utilizing the state transition management unit 6 shown in FIG. 3A.

Reviewed is a case where one descriptor is read from the memory 6_1 at one cycle. In this case, it is necessary to prescribe the configuration and state of the data path by the one descriptor that is read at one cycle. Therefore, the number of bits of the bit string that configures the descriptor is much increased, and it is necessary to handle this bit string once in changing the configuration and state of the data path.

In contrast, when the configuration and state of the data path are changed (switched) by multiplying a plurality of cycles, for example, when the configuration and state of the data path are changed (switched) by multiplying four cycles, the bit string of the descriptor to be transferred or proposed per cycle can be theoretically reduced to ¼ cycle, which makes it possible to achieve the downsizing and speedup.

In addition, the descriptor may be divided per function, and the descriptor corresponding to the used function may be stored in the memory 6_1. In this case, for example, since the descriptor corresponding to the unused function is prevented from being read, the number of cycles is also made variable in changing the configuration and state of the data path. Recited as the descriptor divided per function are a descriptor for designating a transfer of an initial value to the memory included in the circuit block 5, a descriptor for designating a path of input data that uses a DMAC included in the circuit block 5, a descriptor for designating an operation that uses the PE, a descriptor for designating a path of output data that uses the DMAC included in the circuit block 5, and the like, if being exemplified with reference to FIG. 1.

Furthermore, when the configuration and state of the data path are changed (switched) by multiplying the plurality of cycles, the descriptor that is caused to perform the same operation as that immediately before is unnecessary for being read again from the memory 16. In this case, if the state designated by the descriptor that is read immediately before is maintained also in the next cycle, the same operation as that immediately before is performed in the next cycle. This makes it possible to achieve reduction in the reading number of times of the memory 6_1 and reduction in power consumption.

(PE)

Figure 4:
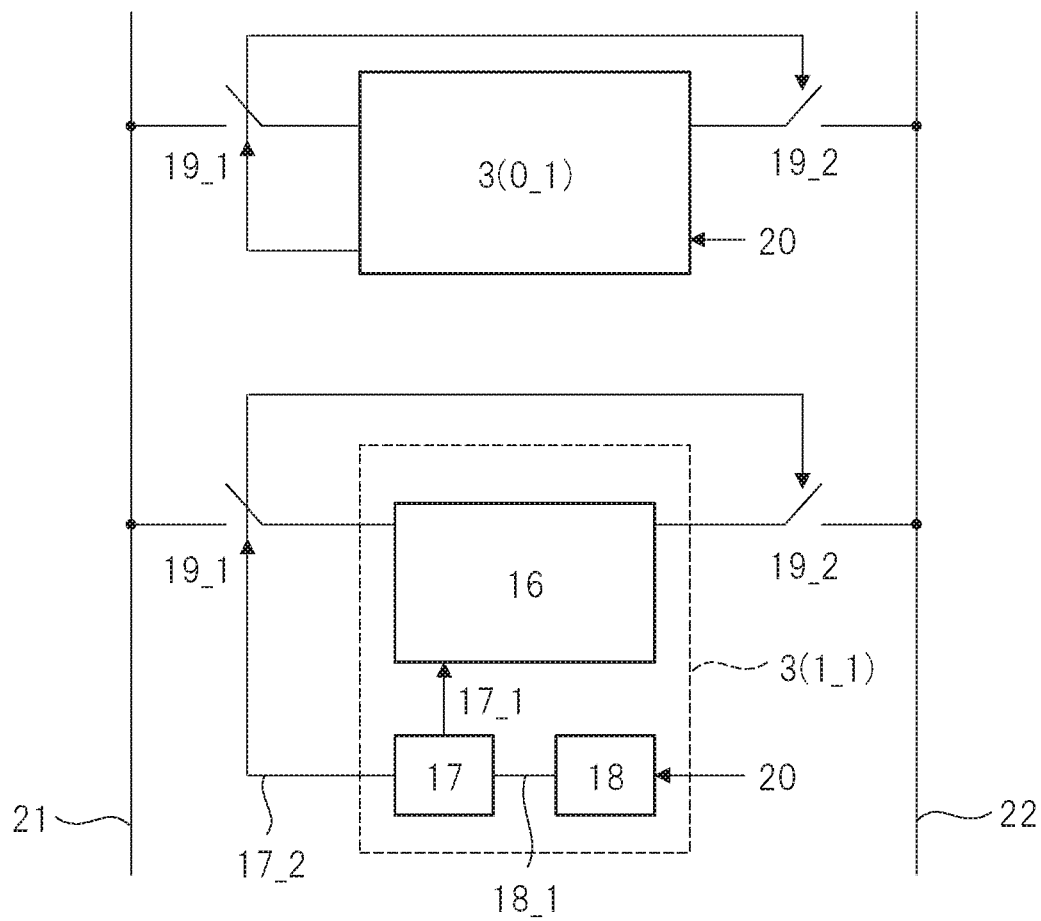
FIG. 4 is a block diagram showing a configuration of a PE according to the first embodiment.

FIG. 4 is a block diagram showing the configuration of the PE according to the first embodiment. Here, the PE 3(1_1) shown in FIG. 1 will be explained as a representative.

Although being not limited in particular, the PE 3(1_1) is connected to the data bus located in its periphery through the P-SW. In FIG. 4, the PE 3(0_1) is exemplified as a PE located in a periphery of PE 3(1_1), and data buses 21, 22 are exemplified as the data bus. In addition, in FIG. 4, the reference numerals 19_1, 19_2 show P-SWs connected between the PEs 3(1_0), 3(1_1) and the data buses 21, 22.

The PE 3(1_1) includes a general-purpose computing unit 16, a processor element control unit (hereinafter, also called PE control unit) 17, and a processor element memory (hereinafter, also called management memory or PE memory) 18. The general-purpose computing unit 16 operates contents designate d by an operation control signal 17_1 outputted from the PE control unit 17. In addition, the P-SWs 19_1, 19_2 become an on or off state according to a switch control signal 17_2 outputted from the PE control unit 17.

The state signal shown in FIG. 3A is supplied as a signal 20 to the PE memory 18. A table, which includes the state signal, and operation information and switch information each corresponding to the state signal, is formed in the PE memory 18 in advance. In other words, the PE memory 18 outputs, as information 18_1 to the PE control unit 17, the operation information and switch information corresponding to the state signal when the state signal is supplied as a signal 20 to the PE 3(1_1). The PE control unit 17 outputs an operation control signal 17_1 based on the supplied operation information and outputs a switch control signal 17_2 based on the switch information. Incidentally, a combination of the operation information and the switch information that are stored in the PE memory 18 is also called state information hereinafter.

Thus, as explained in FIG. 3A, when the state signal is outputted from the management unit 6_2, the operation contents and configuration of the data path carried out in the PE 3(1_1) are be prescribed by the state signal.

Incidentally, when the state signal is supplied as a signal 20 to the memory 20, the PE memory 18 may continually output a plurality of pieces of operation information and switch information in response to this. This makes it possible to continually change the operation contents or/and the configuration of the data path with respect to one state signal.

The PE 3(1_1) has been explained as an example, but the other PEs is similar, too. FIG. 4 has shown an example in which each of the PEs includes the PE memory 18 for controlling the corresponding P-SW, but is not limited to this. For example, the PE memory may be common to the plural PEs or all of the PEs.

In addition, FIG. 4 has been explained as the PE, but each of the arithmetic circuit 4, circuit block 5, and parallel computing unit 7 controls on/off of the P-SW connected between its own circuit and the data bus similarly about them. In this way, the configuration of the data path is determined by the state transition management unit 6. Incidentally, in FIG. 3A, the general computing unit 16 and the P-SW are controlled by the information formed by the decoder 6_3, whereas, in FIG. 3B, the designation information 6_4_1 is supplied as a pointer to each PE and is decoded with the decoder 6_5 in each PE, and the general computing unit 16 and P-SW in each PE and P-SW are controlled by a decode result.

(Generation of Descriptor, Operation Information, and Switch Information)

The descriptor explained in FIG. 3A and the operation information and switch information explained in FIG. 0.4 can be generated by describing, through an arbitrary computer language, a processing that is realized in the array type processor (FIG. 1) and compiling it in a computer. The descriptor generated by compiling it is written in the memory 6_1 that has been explained in FIG. 3A. meanwhile, the generated operation information and switch information are written, as a table forming a pair together with the state signal, for example, in the PE memory 18 (FIG. 4) in the PE.

(Deep Learning Processing)

Figure 5:
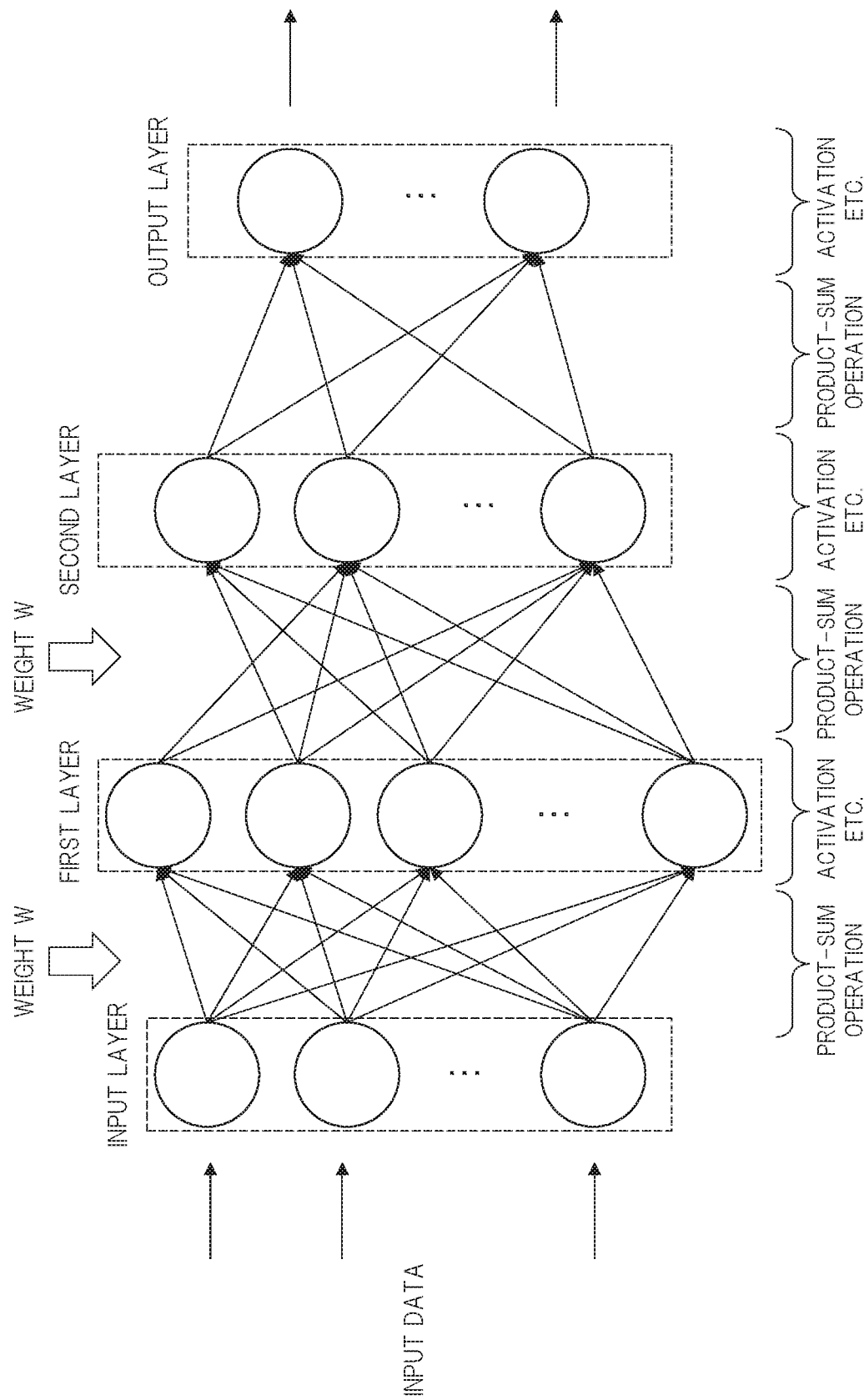
FIG. 5 is a view showing an example of a configuration of a neural network.
Figure 6:
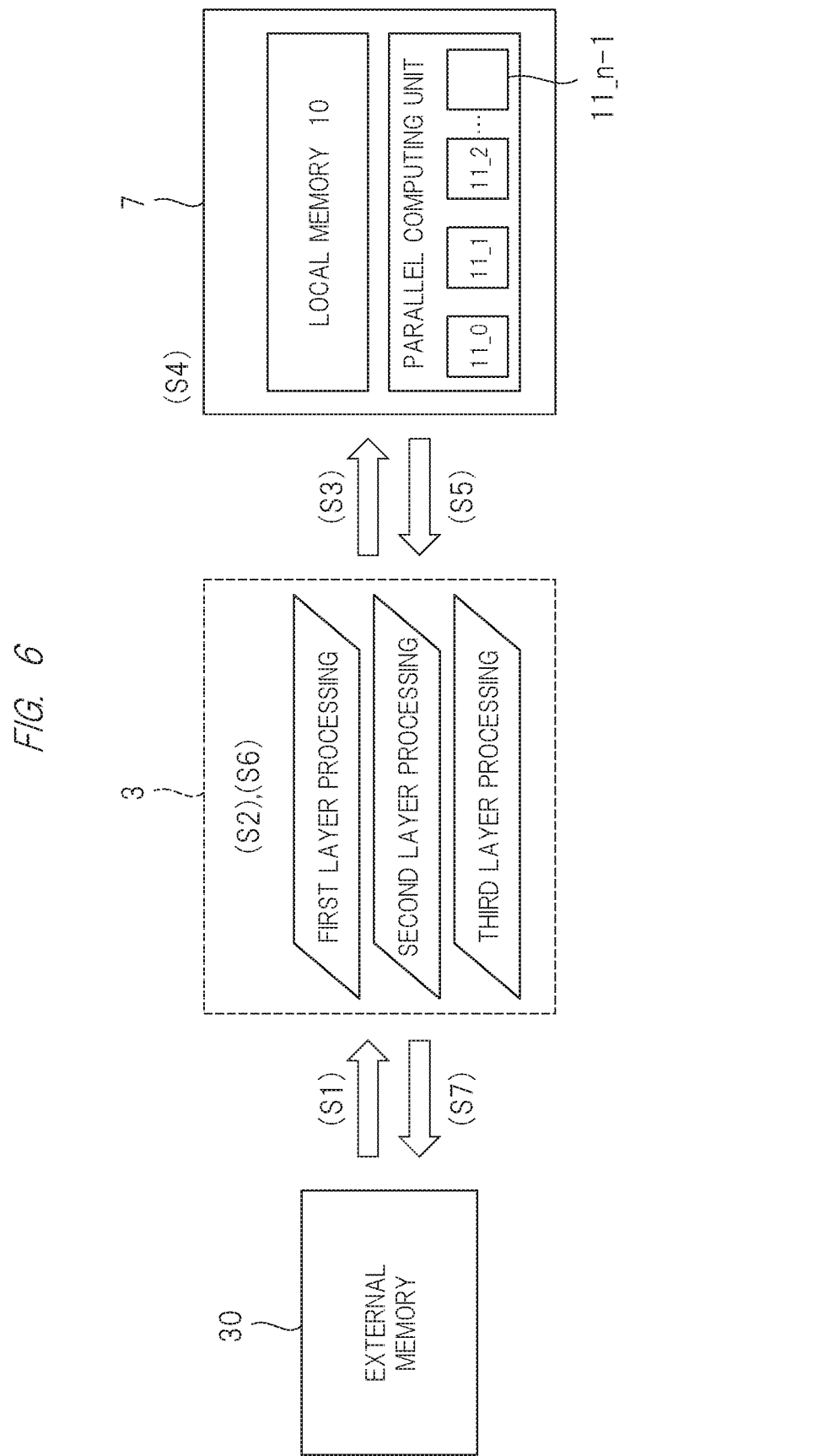
FIG. 6 is a schematic view showing a flow of an arithmetic processing of the neural network.

Next, explained will be an example in which a deep learning processing is realized with the array type processor 2 shown in FIG. 1. At first, handling of a neural network that is repeated for performing the deep learning processing will be explained with reference to FIGS. 1, 2, 5 and 6. Here, FIG. 5 is a view showing an example of a neural network structure. FIG. 6 is a schematic view showing a flow of an arithmetic processing of the neural network.

The array type processor 2 shown in FIG. 1 is suitable for a convolution processing carried out in the deep learning processing. In the convolution processing, the same weight is used many times very much. In the array type processor 2, the weight is maintained by the local memory 10 (FIG. 2), the processing can be performed with good efficiency. FIG. 5 shows not the convolution processing, but an example of all of combinations that do not reuse the same weight. By using this FIG. 5, an outline of the arithmetic processing in the neural network will be explained.

as shown in FIG. 5, the operation of the neural network takes the procedure of: performing the product-sum operation for multiplying the weight w (w'); performing an operation such as activation to the product-sum operation result; and outputting the operation result.

The array type processor 2 according to the first embodiment carries out the procedure shown in FIG. 5 by a flow shown in FIG. 6. In FIG. 6, the reference numeral 30 is not limited in particular, but shows an external memory provided outside the array type processor 2. The input data is stored in this external memory 30, and an operation result obtained in the array type processor 2 is written in the external memory 30 again. In addition, the weight w (w') is stored in the local memory 10 in the parallel computing unit 7.

The array 3 reads the input data (feature quantity) necessary for the operation from the external memory 30 in step S1. In step S2, the configuration and state of the data path of the array 3 are set by the state transition management unit 6, and the feature quantity from the external memory 30 is supplied to the parallel computing unit 7 one by one in step S3. The parallel computing unit 7 carries out, in order of its reception in step S4, the product-sum operation processing by multiplying the weight w (w') stored in the local memory 10 by the feature quantity supplied from the array 3 one by one. The operation result of the product-sum operation is outputted with the parallel computing unit 7 one by one in step S5.

The array 3 carries out operations such as addition and activation to the data received from the parallel computing unit 7 as needed in step S6. In step S7, the array 3 writes, as another feature quantity, the result of the operation in the external memory 30. The processing of the neural network is realized by such a processing, and the arithmetic processing necessary for the processing of the deep learning is carried out by repeating this processing.

In this way, in the array type processor 2 according to the first embodiment, carrying out the regular product-sum operation processing with the parallel computing unit 7 among the necessary arithmetic processings makes it possible to realize the speedup. In addition, an arithmetic processing(s) other than the product-sum operation processing is carried out with the array 3 which can dynamically reconfigure a circuit(s) by the state transition management unit etc. This makes it possible to flexibly set a processing such as activation in each of layers described as a first layer (first layer processing), a second layer (second layer processing) and an output layer (third layer processing) in FIGS. 5 and 6. Furthermore, the number of parallel computing units that complies with the necessary arithmetic processing(s) can be used from among the plural parallel computing units provided in the array type processor 2 in advance, and the number of PEs etc. that complies with the necessary arithmetic processing(s) can be used also regarding the array 3. In other words, flexibility can be improved.

(Product-Sum Operation with Parallel Computing Unit)

Figure 7:
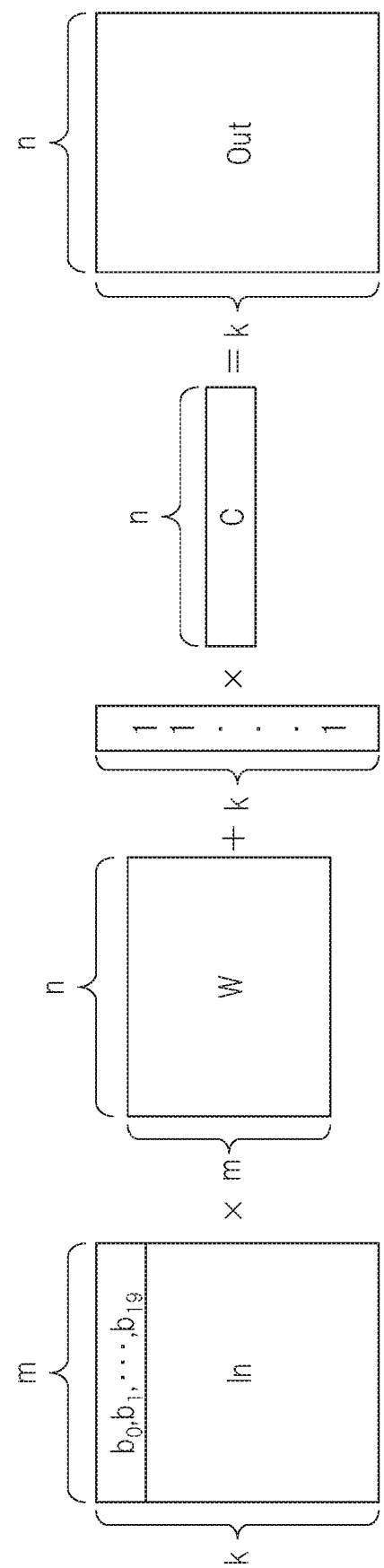
FIG. 7 is a view schematically showing a matrix operation expression.
Figure 9:
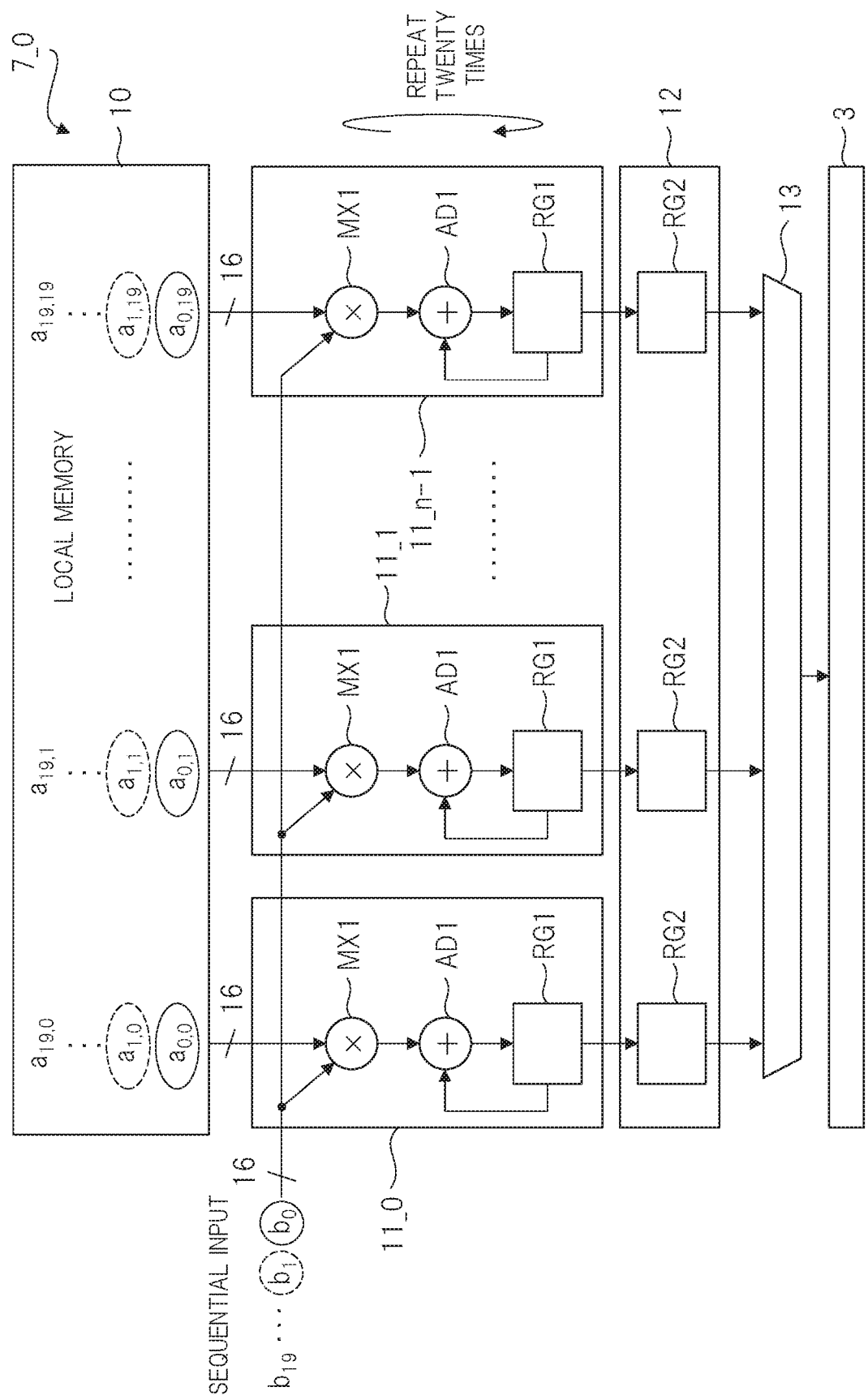
FIG. 9 is a block diagram showing a configuration of a parallel computing unit according to the first embodiment.

Next, a specific example(s) of the product-sum operation carried out with the parallel computing unit 7 will be explained with reference to the drawing. FIGS. 7 to 9 are diagrams for explaining processings with the parallel computing unit according to the first embodiment. Here, FIG. 7 schematically shows a matrix operation expression, and FIG. 8 shows a matrix operation expression corresponding to that of FIG. 7. In addition, FIG. 9 shows more specific configuration of the parallel computing unit 7.

In FIG. 7, In shows matrix data composed of elements of k rows □ m columns, and W shows matrix data composed of elements of m rows □ n columns. An element of the matrix data In corresponds to input data that is inputted into the parallel computing unit 7_0, and an element of the matrix data W is data stored in the local memory 10 of the parallel computing unit 7 and corresponds to the weight w (w') which has been explained in FIG. 5. In an example of FIG. 7, multiplication is performed between the element of the matrix data In and the element of the matrix data W, a bias value C is added to each element of the multiplication results, and the results are outputted as matrix data Out composed of the elements of the k row U n column. Incidentally, this bias value C is also stored in the local memory 10.

Explained will be an example in which the product-sum operation with respect to the matrix data In about a first layer processing is carried out. At first, the matrix data W and the bias value C that correspond to the matrix data In are transferred, an initial values, to the local memory 10 in the parallel computing unit 7. Then, first row data of the matrix data In is read from the external memory 30, and is supplied to the array 3. At this time, since the array 3 has the configuration of the data path that has been prescribed by the state transition management unit 6, the predetermined processing determined by the configuration of the data path is carried out with respect to the read first row data and the result obtained by carrying out the predetermined processing is supplied, as the first row data, to the parallel computing unit 7.

In the parallel computing unit 7, the bias value C from the local memory 10 is set, an initial value, to the product-sum operation unit 11. Then, the product-sum operation unit 11 performs the product operation between the first row data (result obtained by carrying out the predetermined processing) supplied from the array 3 and the first column data of the matrix data W read from the local memory 10.

FIG. 8 shows an example of the product-sum operation in case where the number of columns (m) of the matrix data In is 20 and the number of columns (n) and row (m) of the matrix data W is 20. When the example of FIG. 8 is used and explained, the predetermined processing(s) is carried out by the array 3 with respect to the first row data b0 to b19 of the matrix data In. The product-sum operation unit 11 performs the product-sum operation with the matrix data W with respect to the result of this processing. The product-sum operation unit 11 performs the product-sum operation with the matrix data W similarly to second or subsequent row of the matrix data In. In addition, in a process of performing the product operation by the product-sum operation unit 11, the result of the product operation is accumulated, and the bias value C is also added to it. In this way, each element of the matrix data Out is calculated.

FIG. 9 shows a configuration of a parallel computing unit 7_0 as an example of the parallel computing unit according to the first embodiment. Here, shown is a case where the elements of matrix data In, W are represented at 16 bits. As shown in FIG. 9, the product-sum operation unit 11 (e.g., 11_0) includes a product operation unit MX1, an adder AD1, and a register RG1. The bias value C is set as an initial value to the register RG1.

Then, it is sequentially inputted into the parallel computing unit 7_0 from the first row element b0 of the matrix data In toward the element b19 (elements in which the predetermined processing(s) has been carried out by the array 3).

The element b0 is inputted into the product-sum operation units 11_0 to 11_$n$-1 at the same time; a product operation unit MX1 in each of the product-sum operation units 11_0 to 11_$n$-1 carries out the product operation between the element from the corresponding local memory 10 and the element b0; and an adder AD1 performs addition of the product operation result and the bias value C and stores it in the register RG1. In this way, in the expression shown in FIG. 8, an operation of a part which is surrounded with a solid line leads to being carried out.

Next, when the element b1 is inputted into the product-sum operation units 11_0 to 11_$n$-1 at the same time, a product operation unit MX1 in each of the product-sum operation units 11_0 to 11_$n$-1 carries out the product operation between the element from the corresponding local memory 10 and the element b1. In this way, in the expression shown in FIG. 8, an operation of a part which is surrounded with a dashed line is carried out. In addition, since the product operation result is added by the adder Ad1 together with the operation result that is stored in the register RG1, it is accumulated and leads to being stored in the register RG1 again. In this way, for an element (data) input one by one, the product-sum operation is carried out in parallel with respect to the element (data) inputted one by one. Incidentally, since one row element of the matrix data In is 20, the above-mentioned processing is repeated twenty times for handling (processing) one row.

(Operation of Semiconductor Device)

In the array type processor 2 according to the first embodiment, the configuration of the data path can be optionally set by the state transition management unit. In other words, connection between the data bus and the PE etc. that are included in the data path, and the operation contents of the PE can be optionally set.

Figure 10:
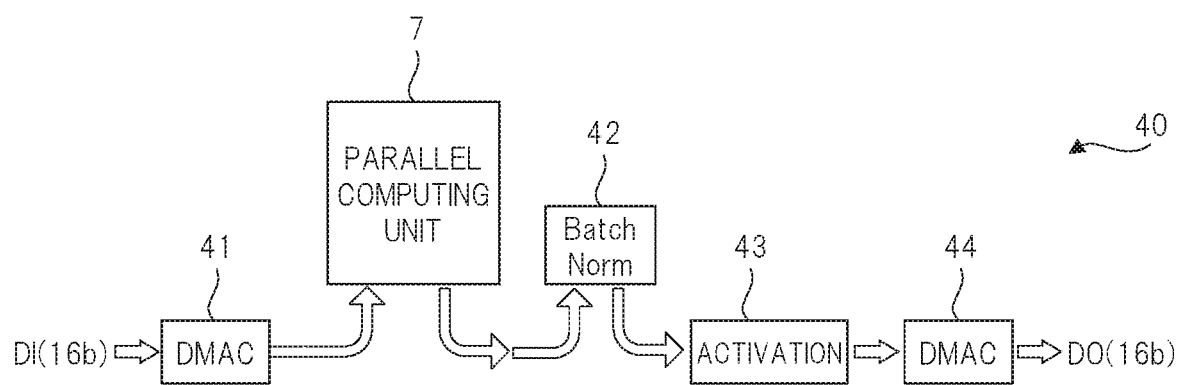
FIG. 10 is a view showing a functional block of an arithmetic processing unit that has been realized by the array type processor according to the first embodiment.

FIG. 10 is a view showing a function block of an arithmetic processing unit realized by the array type processor according to the first embodiment. An arithmetic processing unit 40 shown in FIG. 10 is realized by the array type processor 2 shown in FIG. 1 through the configuration of the data path that is designated by the state transition management unit 6. By this arithmetic processing unit 40, an arithmetic processing of the neural network is performed.

The arithmetic processing unit 40 includes a parallel computing unit 7 and DMAC41, 44. In addition, a batch normalization (hereinafter, also called BatchNorm) function part 42 and an activation function part 43 are constructed by the plural PEs 3( ) arranged in the array 3. For the parallel computing unit 7, for example, the parallel computing unit 70 shown in FIG. 1 is used. In addition, for the DMAC41, 44, the DMAC provided in the circuit block 5 is used.

Figure 16:
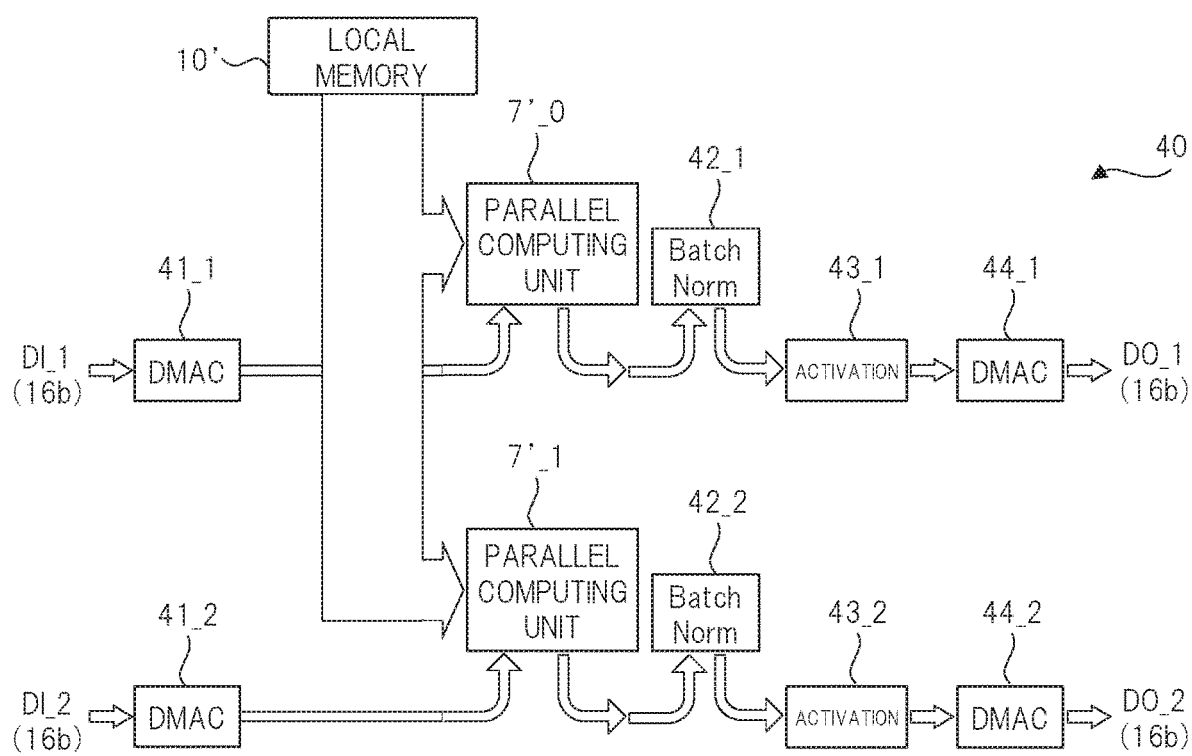
FIG. 16 is a functional block diagram of an array type processor according to a sixth modification of the first embodiment.

16-bit wide input data DI is supplied to the arithmetic processing unit 40 from an external memory 30 shown in FIG. 6, and 16-bit wide output data DO is supplied to the external memory 30 from the arithmetic processing unit 40. In other words, by the DMAC41, 16-bit wide data (feature quantity) are sequentially transferred to the parallel computing unit 7 from the external memory 30. As explained in FIGS. 7 to 9, the product-sum operation is carried out in the parallel computing unit 7, and the result of the product-sum operation is supplied to the BatchNorm function part 42 and is further supplied to the activation function part 43. In this way, for the product-sum operation result, a processing of BatchNorm is carried out, and a processing of activation is carried out. The result of the activated processing is then transferred to the external memory 30 by the DMAC44.

It is desired to maintain the state transition management unit 6 so as not to change the configuration of the data path while the respective processings of the product-sum operation, BatchNorm, and the activation are performed, namely, while a series of processings shown in FIG. 10 is completed. In addition, when the series of processing is completed, the state transition management unit 6 instructs the PE etc. so that the next configuration of the data path becomes the next configuration at once or after a lapse of hours of several cycles.

Explained below as first to seventh modifications will be an example of the arithmetic processing unit 40 realized by the array type processor 2 through the designation by the state transition management unit 6.

First Modification

Figure 11:
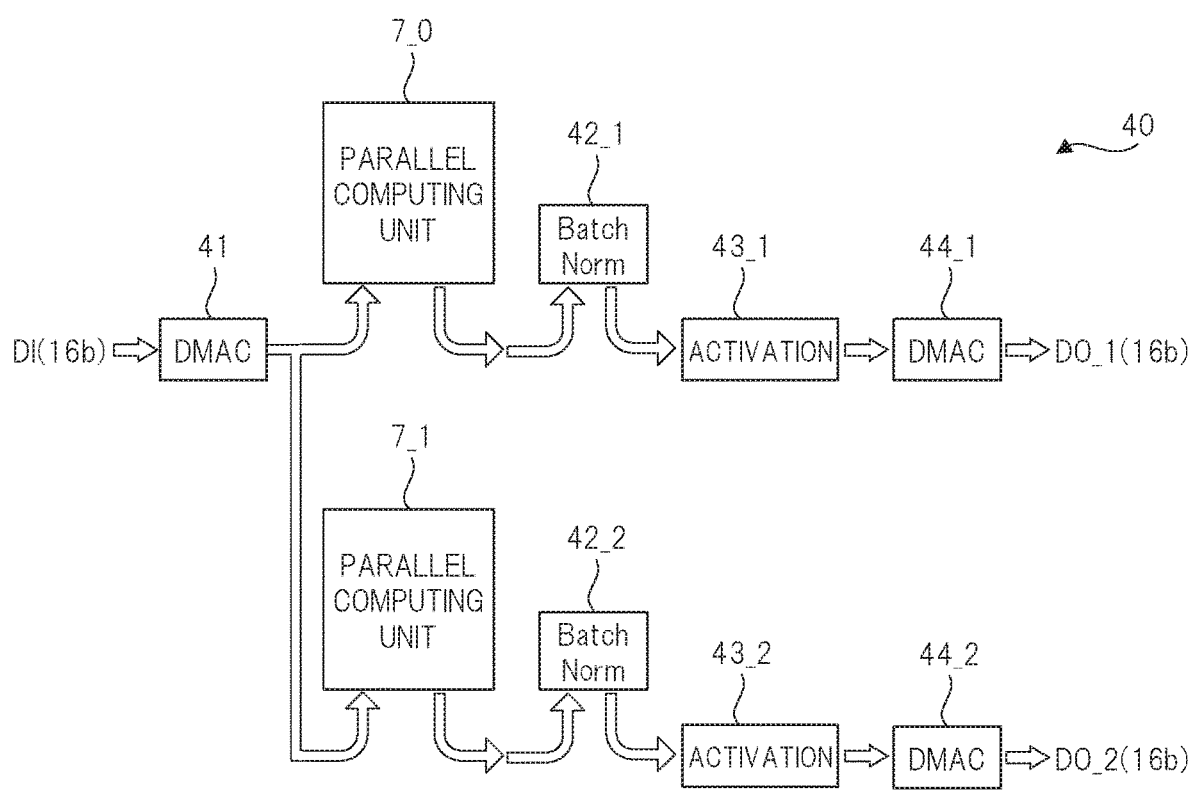
FIG. 11 is a functional block diagram of an array type processor according to a first modification of the first embodiment.

FIG. 11 is a function block diagram showing a first modification of the arithmetic processing unit realized by the array type processor according to the first embodiment.

A first modification shows an arithmetic processing unit that can perform a plurality of different operations with respect to the same input data DI. For example, in one parallel computing unit, a case that the number of processings performed in parallel lacks is thought about. Thought about as a specific example is a case where the number of product-sum operation units 11 included in the parallel computing unit 7 lacks with respect to the number of weights performed in parallel to the same input data DI. In other words, as mentioned with reference to FIG. 8, there is a case where the number of columns of the matrix W exceeds the number of product-sum operation units included in one parallel computing unit 7. The parallel computing unit 7 commonly uses one piece of input data DI with the plural product-sums operation units 11, and carries out the processing(s).

Therefore, when the number of parallel processings lacks, the same input data DI is inputted into the plural parallel computing units, which makes it possible to perform the parallel processings by division. In this case, the weights are divided and store into each local memory 10 of the plural parallel computing units. For example, when the weight is 40 (a0,0 to a0,39 in FIG. 8), these 40 weights are divided in 20 weights, and are stored in the local memories 10 of the parallel computing units 7_0, 7_1. This makes it possible to operate the one piece of input data and the 40 weights in parallel. In this case, the output data outputted from each parallel computing unit is different for each parallel computing unit, and so are outputted individually.

In the first modification, the state transition management unit 6 gives such instructions that the BatchNorm function part 42_1, 42_2 and the activation function part 43_1, 43_2 are configured by the plural PEs arranged on the array 3. In addition, the state transition management unit 6 gives instructions to the parallel computing units 7_0, 7_1 as a parallel computing unit, and gives instructions to the DMAC included in circuit block 5 for the DMAC41, 44_1, 44_2 as a DMAC.

In FIG. 11, the input data DI is transferred to the parallel computing units 7_0, 7_1 by the DMAC41 from the external memory 30. Each of the parallel computing units 7_0, 7_1 carries out the product-sum operation for the same input data DI. In this case, the data stored in the local memory 10 of the parallel computing unit 70 is different from the data stored in the local memory 10 of the parallel computing unit 7_1. For the product-sum operation result obtained by the parallel computing unit 7_0, the processings of BatchNorm and activation are performed by the BatchNorm function part 42_1 and the activation function part 43_1, and the result is transferred as output data DO_1 to the external memory 30 by the DMAC44_1. In addition, for the product-sum operation result obtained by the parallel computing unit 7_1, the processings of BatchNorm and activation are performed by the BatchNorm function part 422 and the activation function part 43_2, and the result is transferred as output data DO_2 to the external memory 30 by the DMAC 44_2.

Hereat, the example of using two parallel computing unit has been shown, but am not limited to this. In other words, three of more than the parallel computing units may be used.

Second Modification

Figure 12:
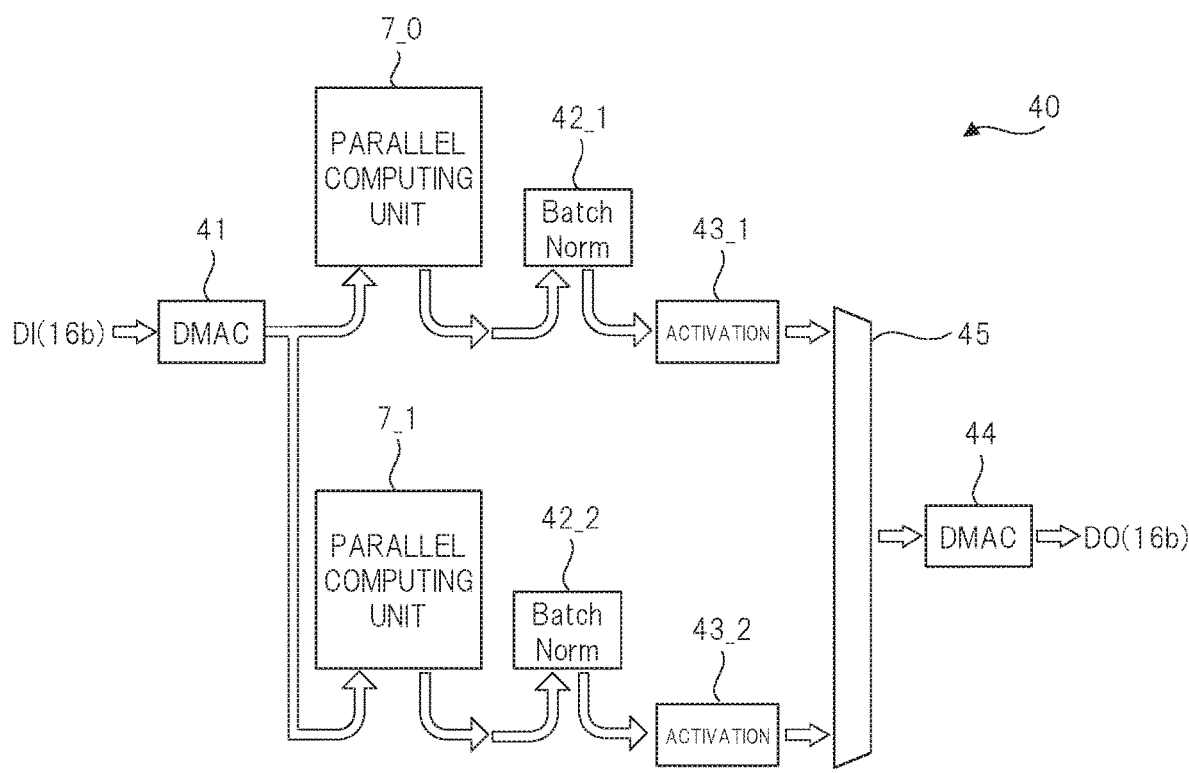
FIG. 12 is a functional block diagram of an array type processor according to a second modification of the first embodiment.

FIG. 12 is a function block diagram showing a second modification of the arithmetic processing unit realized by the array type processor according to the first embodiment. As FIG. 12 is similar to FIG. 11, a difference therebetween will be mainly explained.

The difference is that the outputs of the activation function parts 43_1, 43_2 are supplied to a selector function part 45, and the output of the activation function part selected by the selector function part 45 is transferred as the output data DO to the external memory 30 by the DMAC44. For example, the selector function part 45 is configured by combining the predetermined PE and the P-SW corresponding to it.

According to the second modification, the processing results formed in parallel are serialized and can be transferred to the external memory 30. In other words, since the output of one parallel computing unit is transferred as one piece of sequential data, it can be transferred as one piece of sequential data to the external memory 30 even when a division processing is performed by the plural parallel computing unit.

Third Modification

Figure 13:
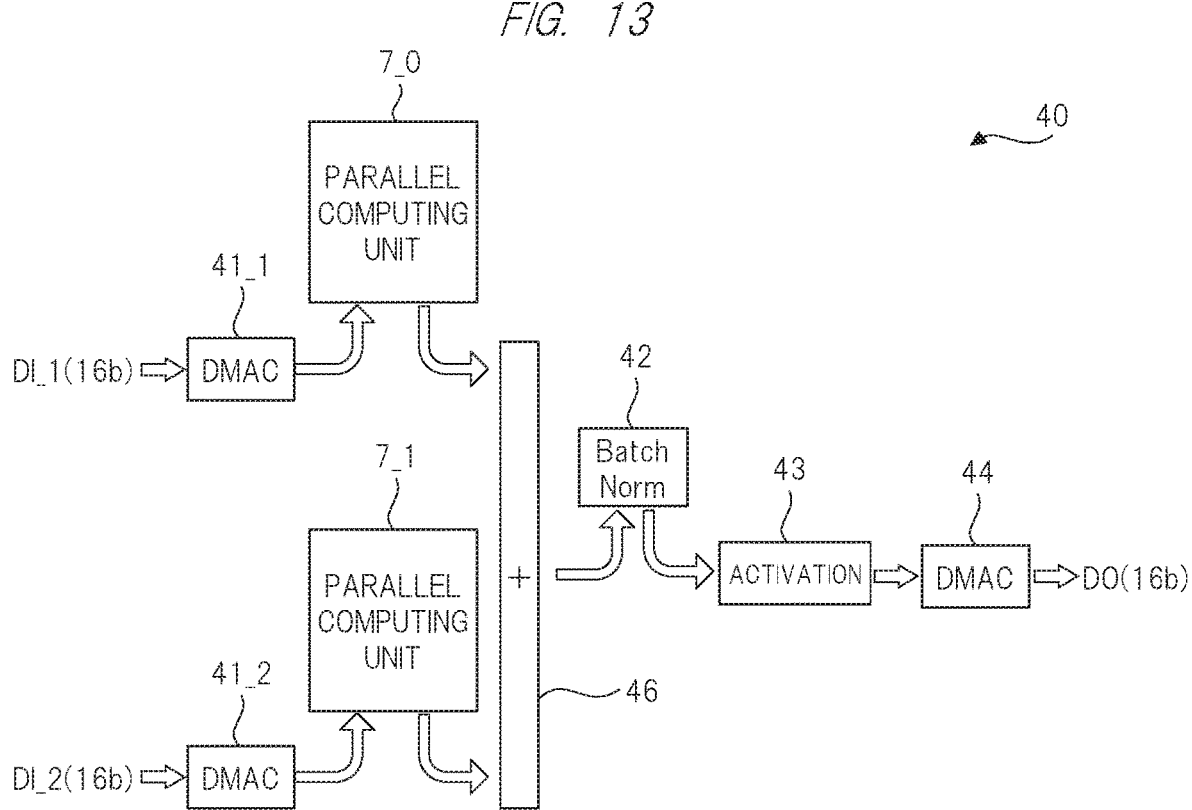
FIG. 13 is a functional block diagram of an array type processor according to a third modification of the first embodiment.

FIG. 13 is a function block diagram showing a third modification of the arithmetic processing unit realized by the array type processor according to the first embodiment. As FIG. 13 is similar to FIG. 12, a difference therebetween will be mainly explained.

The difference is that the respective processing results of the parallel computing unit 7_0, 7_1 are added by an addition function part 46. In addition, the processings of the BatchNorm and the activation are performed to a result obtained by this addition through the BatchNorm function part 42 and the activation function part 43, and the result is transferred as output data DO_2 to the external memory 30 by the DMAC44. For example, the addition function part 46 is configurated by combining the predetermined PE and the P-SW corresponding to it.

The third modification is suitable to a case where the number of pieces of input data is heavy. For example, as mentioned with reference to FIG. 7, the arithmetic processing unit 40 is suitable to a case where the row number m of the matrix In is high. In this case, the input data read from the matrix In is divided into input data DI_1, DI_2. For each piece of the input data DI_1, DI_2 obtained by the division, the product-sum operations are carried out by the parallel arithmetic units 7_0, 7_1, and add the product-sum operation results are added by the addition function part 46. For this addition result, the processings of BatchNorm and activation is performed by the DMAC44, and the addition result performed is transferred to the external memory 30. In this way, even when the number of pieces of input data exceeds the number of product-sum operation units configuring one parallel computing unit, the processing of the product-sum operation is performed and the processings of BatchNorm and activation etc. can be also performed.

Fourth Modification

Figure 14:
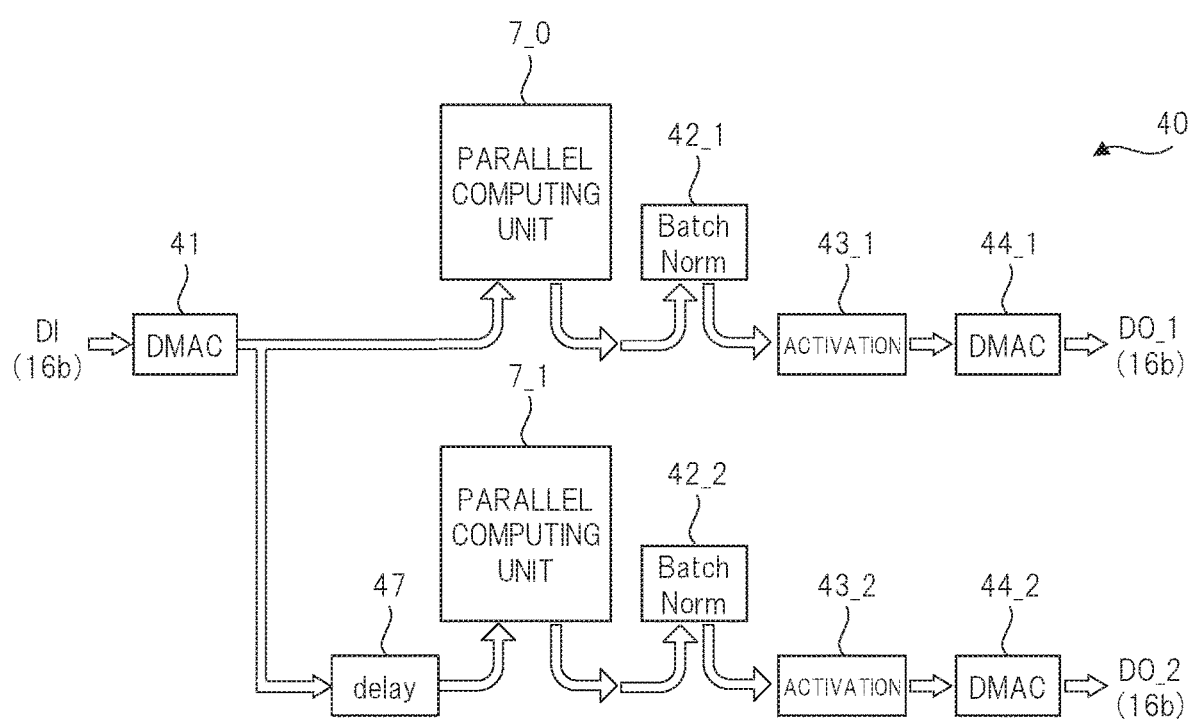
FIG. 14 is a functional block diagram of an array type processor according to a fourth modification of the first embodiment.

FIG. 14 is a function block diagram showing a fourth modification of the arithmetic processing unit realized by the array type processor according to the first embodiment. As FIG. 14 is similar to FIG. 11, a difference therebetween will be mainly explained.

A difference is that a delay function part 47 is added. The delay function part 47 is realized by, for example, setting as a delay buffer or FIFO the memory provided in the circuit block 5. Of course, the delay buffer or FIFO is provided in the circuit block 5 in advance, and this may be used.

The fourth modification is suitable to use the same input data with time lag. The input data DI is transferred to the parallel computing unit 7_0 by the DMAC41 and is transferred to the delay function part 47. The input data DI transferred to the delay function part 47 is maintained by the delay function part 47, and the maintained input data DI delays and is supplied to the parallel computing unit 7_1. As a result, the output data DO_1 corresponding to the input data DI is transferred to the external memory 30 and the output data DO_2 corresponding to the same input data DI delays and is transferred to the external memory 30. In this way, it is not necessary to transfer the same input data DI from the external memory 30 twice.

Fifth Modification

Figure 15:
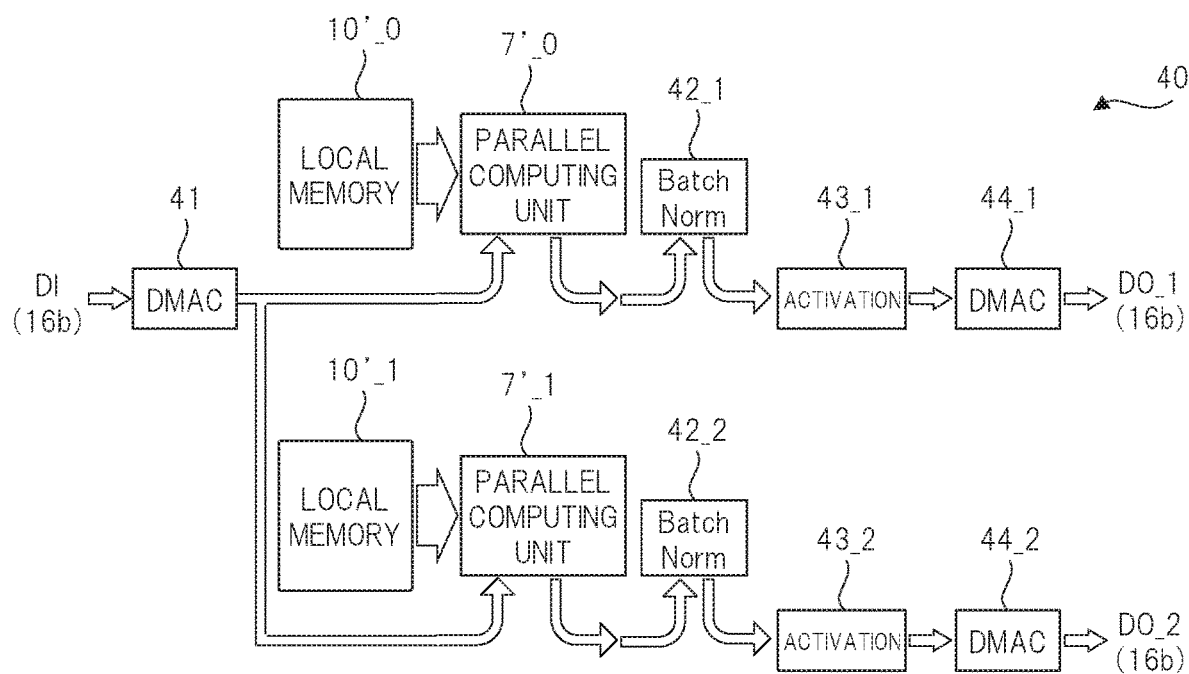
FIG. 15 is a functional block diagram of an array type processor according to a fifth modification of the first embodiment.

FIG. 15 is a function block diagram showing a fifth modification of the arithmetic processing unit realized by the array type processor according to the first embodiment. As FIG. 15 is similar to FIG. 11, a difference therebetween will be mainly explained.

The difference is that the parallel computing unit 7 is changed and becomes a parallel computing unit 7' and a local memory 10' is located outside the parallel computing unit 7'. Each of the parallel computing units 7'_0, 7'_1 has a configuration in which the local memory 10 is removed from the parallel computing unit 7 shown in FIG. 2. The local memory 10'_1, 10'_2 function as local memories of the parallel computing units 7'_0, 7'_1. In other words, the parallel computing units 7'_0, 7'_1 carry out the product-sum operations by using the data from the local memories 10'_1, 10'_2.

Sixth Modification

FIG. 16 is a function block diagram showing a sixth modification of the arithmetic processing unit realized by the array type processor according to the first embodiment. As FIG. 16 is similar to FIG. 15, a difference therebetween will be mainly explained.

The difference is that the local memory 10' common to two parallel computing units 7'_0, 7'_1 is located. The sixth modification is suitable to a case where the product-sum operation of the same data is performed with respect to the input data DI_1, DI_2 mutually different.

From the common local memory 10', the common data is supplied to the parallel computing units 7'_0, 7'_1. Since the input data supplied to the parallel computing units 7'_0, 7'_1 is different from the input data DI_1, DI_2, the parallel computing units 7'_0, 7'_1 perform the product-sum operation to the different input data by using the same data from the local memory 10'.

This makes it possible to reduce the number of necessary local memories by ½, and achieve the reduction in power consumption and the reduction in memory capacity in the local memory. From a slightly different angle, even when the local memory 10' of the same memory capacity is used, the memory capacity capable of being used by the parallel computing unit 7 can be doubled.

Seventh Modification

Figure 17:
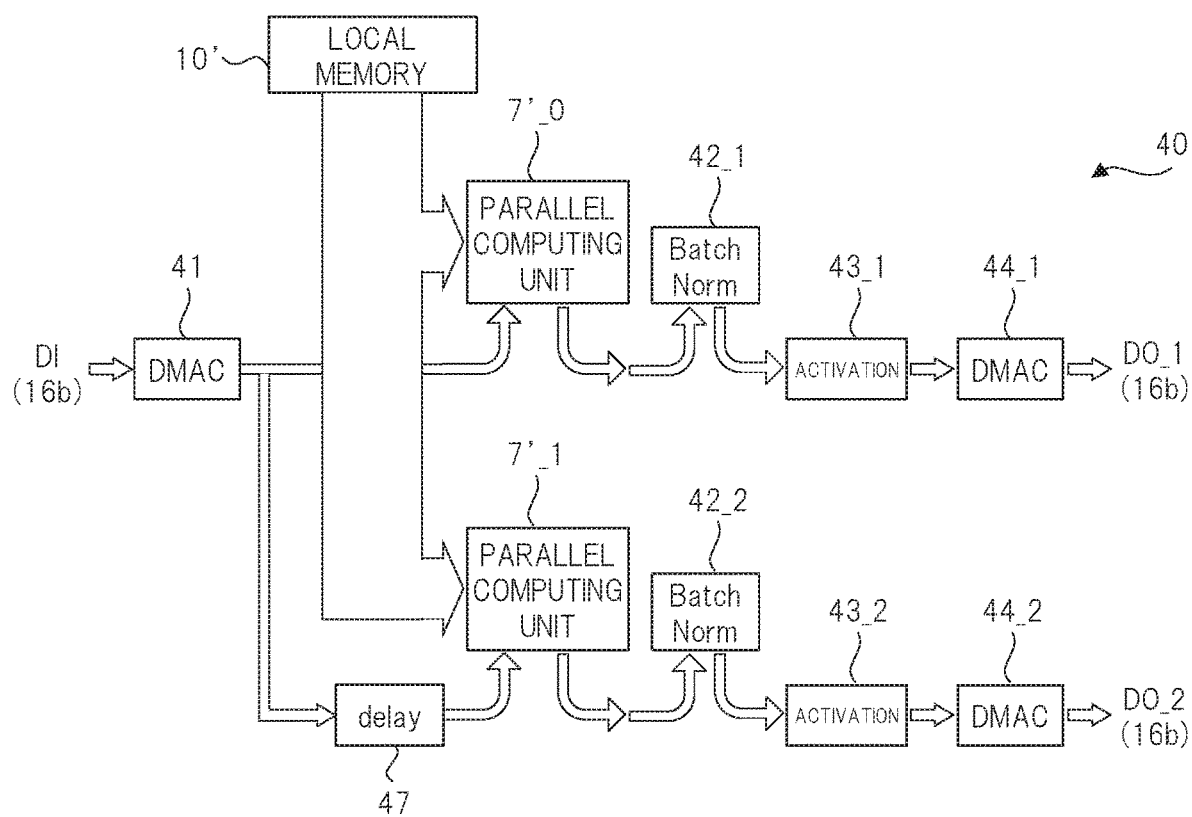
FIG. 17 is a functional block diagram of an array type processor according to a seventh modification of the first embodiment.

FIG. 17 is a function block diagram showing a seventh modification of the arithmetic processing unit realized by the array type processor according to the first embodiment. As FIG. 17 is similar to FIG. 16, a difference therebetween will be mainly explained.

The different is that, similarly to FIG. 14, the delay function part 47 is provided and the delayed input data DI is supplied to the parallel computing unit 7_1'.

In the seventh modification, each of the parallel computing units 7'_0, 7'_1 performs the operation between the same input data DI and the data from the common local memory 10' and data. However, the parallel computing unit 7'_1 leads to performing the operation with respect to the input data DI temporally delayed by the delay function part 47. This makes it possible to obtain, similarly to the sixth modification, the operation results temporally delayed with respect to the same input data while the reduction in power consumption and the reduction in memory capacity in the local memory are achieved.

The example of using two parallel computing units as the first to seventh modifications has been shown, but is not limited to this. For example, the number of parallel computing units may be three or more.

In this way, in the first embodiment, by the state transition management unit 6, the operation contents of the PE are prescribed, and the connection between the PE etc. and the data bus can be made programmable. In other words, by the state transition management unit 6, any data path can be configured and, as explained in FIGS. 10 to 17, the arithmetic processing units 40 having various kinds of configurations can be realized by the array type processor 2. Namely, by the array type processor 2, various kinds of configurations depending on purposes can be realized by the array type processor 2. The parallel computing unit to need a large number of data input and output particularly at the same time is sequentially inputted and outputted and is mounted as an arithmetic processing unit on the array type processor 2, so that, with arithmetic processing performance (simultaneous operand) enhanced, the connection between the data bus with small width and the PE etc. is made programmable and the configuration with high flexibility can be realized.

(State Transition Management Unit and Data Path)

Figure 18:
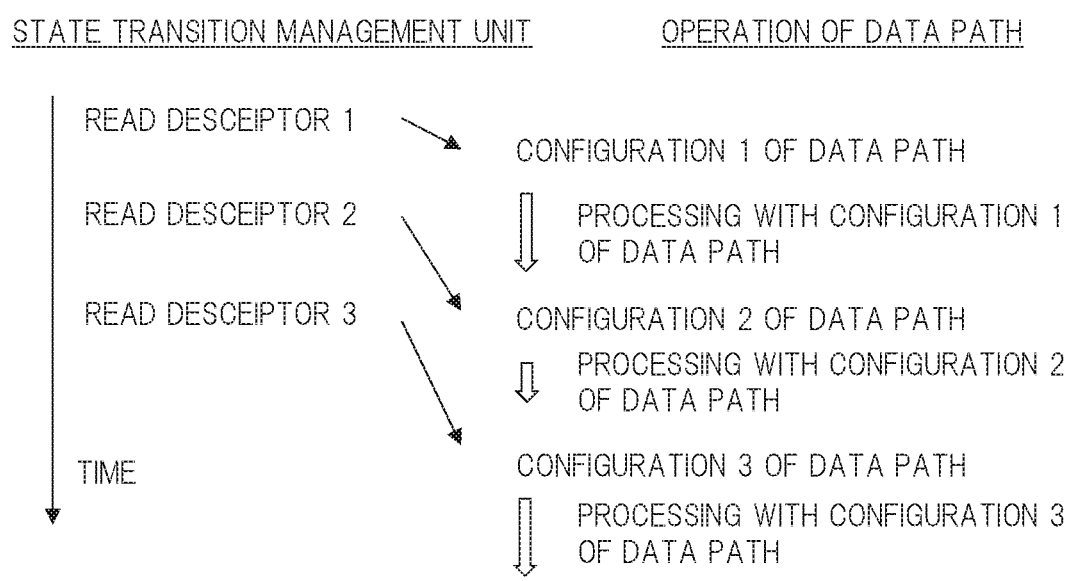
FIG. 18 is a timing diagram showing a relationship the state transition management unit according to the first embodiment and a data path.

Next, a relationship between the state transition management unit and data path that use the descriptor shown in FIG. 3A will be explained with reference to the drawings. FIG. 18 is a timing diagram showing a relationship the state transition management unit according to the first embodiment and a data path.

In the state transition management unit 6, the descriptor is read from the memory 6_1 shown in FIG. 3A, and the read descriptor 1 is decoded and is outputted to the data path. For example, in the data path, the operation contents of the PE 3( ) are determined according to the descriptor 1, and the state of corresponding P-SW is determined. In this way, the configuration of the data path becomes configuration 1, and a processing depending on data path configuration 1 is carried out with respect to data supplied to the data bus in the data path. In the data path, configuration 1 continues until a condition prescribed with the descriptor 1 is met.

Although being not limited in particular, the state transition management unit 6 reads the next descriptor 2 in a period of time when the data path maintains configuration 1, and prepares a configuration of the next data path. When a processing by data path configuration 1 is finished, the state transition management unit 6 outputs a decode result of the descriptor 2 to the data path. In this way, the configuration of the data path becomes configuration 2, and a processing according to data path configuration 2 is carried out with respect to the data supplied to the data path. Subsequently, this operation is repeated, and a series of processings designated by the descriptor is carried out in the data path.

In FIG. 18, shown has been an example in which, in a period of time when the data path has the predetermined configuration, the state transition management unit 6 read the next descriptor (descriptor 2). This makes it possible to achieve reduction in time of the processings by foreseeing the descriptor. However, the state transition management unit 6 may begin to read the descriptor after completion of the processing by the data path in order to achieve simplification of the circuit configuration.

Here, mentioned will be a technique related to the present invention that has been filed earlier. In the invention that has been filed earlier, a large-scale arithmetic processing such as a deep learning processing is carried out by using an array type processor and a hardware accelerator. However, since balances of processing performance required by an application(s) to be executed and by each of the array type processor and the hardware accelerator for each layer in the application are different, there have been problems in which it is different to always make a processing balance between the array type processor and the hardware accelerator good and the performance of the hardware accelerator is insufficiently utilized. In addition, there have also been a problem in which the flexibility in the hardware accelerator is low. Further, there have also been a problem in which when the scale of the hardware accelerator is enlarged and its processing performance is improved, the processing performance of the array type processor also needs to be improved and overhead in area is increased.

More specifically, the hardware accelerator has been configured as an operation function only by a parallel computing unit. Therefore, for example, the interposition of the array type processor has certainly been necessary for sending and receiving data between the hardware accelerator and the external memory and for the operation uncapable of being realized by the hardware accelerator. In other words, it becomes difficult to utilize the performance of the hardware accelerator to the maximum when the flexibility of the processing in the hardware accelerator is low and the processing performance of the array type processor lacks. Furthermore, when the scale of the hardware accelerator is made large for improving the processing performance, the scale of the hardware accelerator also needs to be enlarged depending thereon, the balance of the processing performance between both worsens, and it becomes difficult to utilize the performance of the hardware accelerator.

In addition, the processing must be certainly carried out by the program of the array type processor even if it is typical. Furthermore, when the parallel operation and the processing other than it are mixed, sending and receiving the data occur between the array type processor and the hardware accelerator frequently, which brings inefficiency. Meanwhile, when only the hardware accelerator performing a fixed processing such as a parallel operation is provided, there is a high possibility that if a processing unexpected at first occurs, the unexpected processing will not be performed. Therefore, the existence of the array type processor is very important, too.

In the first embodiment, the parallel computing unit 7 in which the input and output of the data are carried out sequentially is added as one computing unit (computing element) of the array type processor 2. In addition, the configuration of the data path of the array type processor 2 is prescribed by the state transition management unit 6. In other words, the operation contents of the PE 3( ), the inter-element connection such as the PE 3( ), and the connection between the element and the data bus can be flexibly changed by the state transition management unit 6. This make it possible to perform a large-scale operation at high speed even if only the array type processor 2 is used, and to change the processings flexibly, too.

In other words, according to the first embodiment, provided is the array type processor 2 which is expanded so that a higher-speed parallel operation is enable by the parallel computing unit 7 and which can further change the processing flexibly. As a result, provided is the high-performance array type processor suitable for the deep learning processing that carries out a large number of product-sum operations.

Second Embodiment (Semiconductor Device and Parallel Computing Unit)

Figure 19:
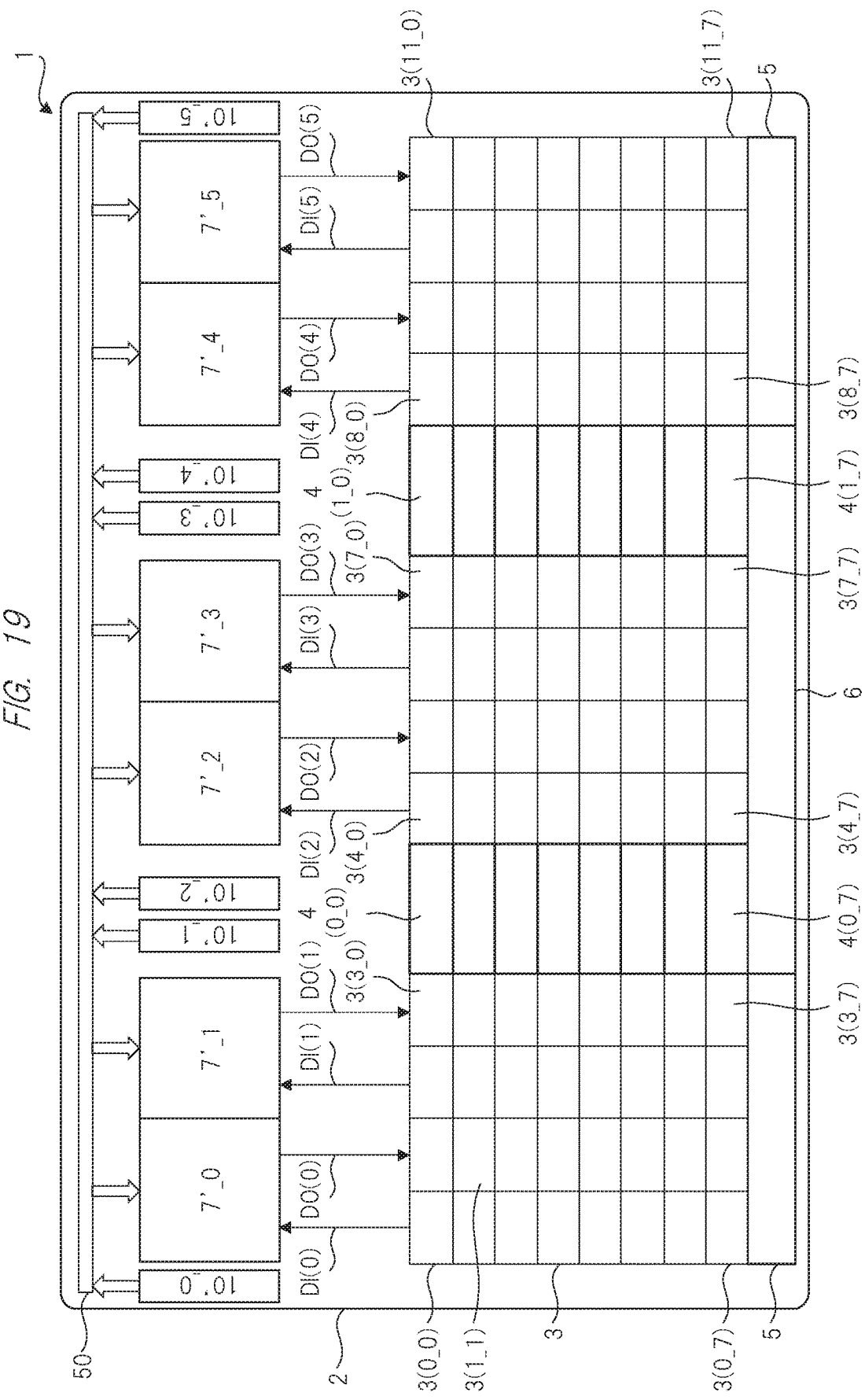
FIG. 19 is a block diagram showing a configuration of a semiconductor device according to a second embodiment.

FIG. 19 is a block diagram showing a configuration of a semiconductor device 1 according to a second embodiment. Since FIG. 19 is similar to FIG. 1, a difference therebetween will be mainly explained.

The difference is that the local memory 10 is located in the parallel computing unit 7 in FIG. 1, but the local memory 10 is taken out outside the parallel computing unit in FIG. 19. With this, the parallel computing unit is changed to a configuration including no local memory, thereby becoming a parallel computing unit 7'. In FIG. 19, the local memory is denoted by the reference numeral 10', and the local memory 10' and the parallel computing unit 7' are connected to the data bus 50.

Figure 20:
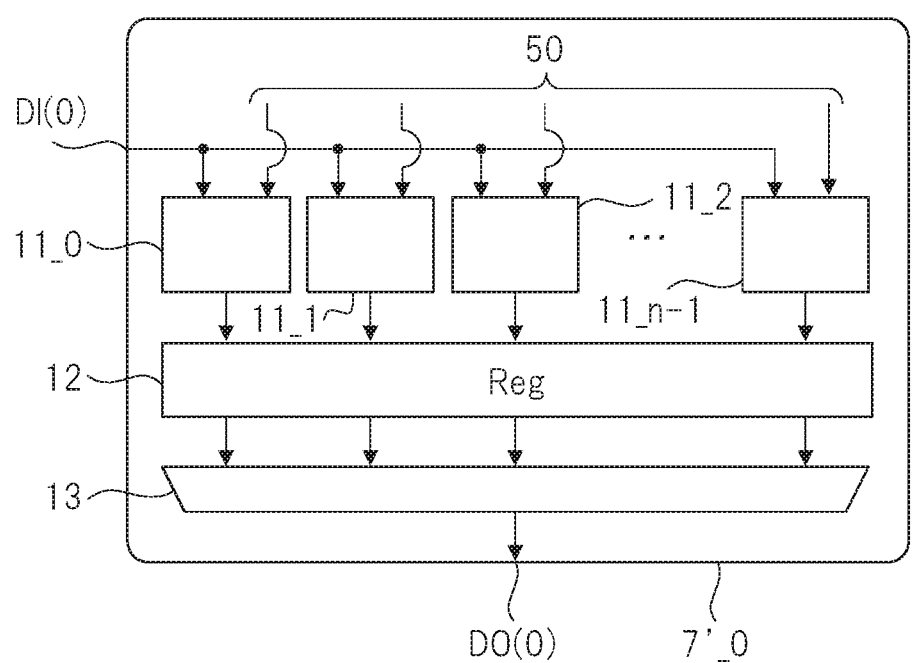
FIG. 20 is a block diagram showing a configuration of a parallel computing unit according to the second embodiment.

FIG. 20 is a block diagram showing a configuration of the parallel computing unit according to the second embodiment. In FIG. 20, the reference numeral 7'_0 shows a parallel computing unit. The configuration of the parallel computing unit 7'_0 is similar to the parallel computing unit 70 shown in FIG. 2. The difference is that the parallel computing unit 7'_0 includes no local memory and the other input terminal groups of the product-sum operation units 11_0 to 11_$n$–1 are connected to the data bus 50. Incidentally, connected to the one input terminal groups of the product-sum operation units 11_0 to 11_$n$–1 is the input line group DI(0) similarly to the parallel computing unit 7_0. In addition, although being not limited in particular, the parallel computing unit 7'_0 does not have the control unit 14 shown in FIG. 2. The product-sum operation units 11_0 to 11_$n$–1, the register 12, and the selector 13 are controlled by the state signal from the state transition management unit 6. The parallel computing unit 7'_0 has been explained as an example, but the remaining parallel computing units have similar configurations, too.

In the second embodiment, the data supplied to the parallel computing unit 7'_0 to 7'_5 is selected from among the data outputted from the local memories 10'_0 to 10'_5. In other words, the state transition management unit 6 selects the data supplied to the parallel computing units 7'_0 to 7'_5 from among the data outputted from the local memories 10'_0 to 10'_5. This makes it possible to supply, to the plural parallel computing unit, the data from the same local memory. For example, the state transition management unit 6 selects the data read from the local memory 10'_0 so as to be supplied commonly to the parallel computing units 7'_0 to 7'_5. This makes it possible to make the number of required local memories less than the number of parallel computing unit 7. As a result, by stopping the operation of the unused local memory, reduction in power consumption can be achieved.

In addition, collecting the plural local memories and assigning it to the parallel computing units make it possible to increase the memory capacity usable in the parallel computing units. For example, assigning both of the local memory 10'_0, 10'_1 to the parallel computing unit 7'_0 makes it possible to double the memory capacity useable in that parallel computing unit 7'_0.

In the configuration shown in FIG. 19, a lot of wirings between the local memory and the parallel computing unit need to supply individual data to each parallel computing unit. Therefore, it is desired to arrange the local memory and the parallel computing unit physically in the vicinity of each other. In addition, regarding the above wirings, it is desired to provide any limit in arranging them. Meanwhile, the input data supplied to the parallel computing unit is one parallel such as a 16-bit width and it is narrower than the above-mentioned wirings, so that it is desired that the flexibility of the wirings is ensured on an input line group DI(0) side.

Figure 21A:
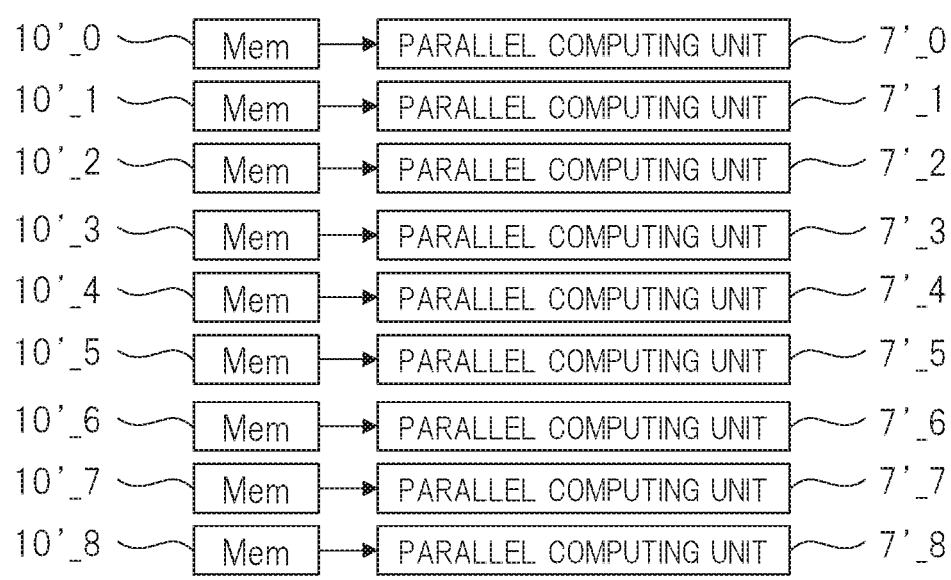
FIG. 21A is a view showing a relationship a local memory according to the second embodiment and the parallel computing unit.
Figure 21B:
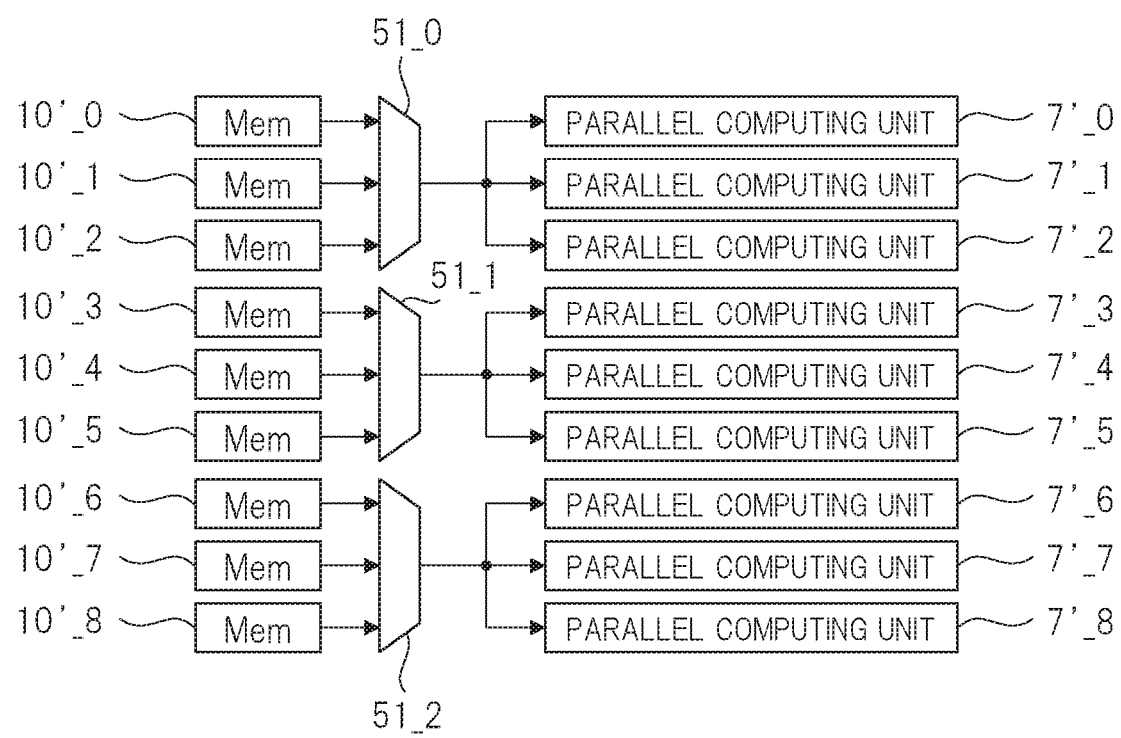
FIG. 21B is a view showing a relationship a local memory according to the second embodiment and the parallel computing unit.

Next, specific allocation of the local memory 10' to the parallel computing unit 7' will be explained with reference to the drawings. FIG. 21 is view showing a relationship between the local memory and the parallel computing unit according to the second embodiment. FIG. 21A shows a case of making a local memory and a parallel computing unit one to one, and FIG. 21B shows a case of assigning three local memories to a parallel computing unit. Of course, the number of local memories to be assigned to the parallel computing unit is not limited to three, and may be two or be four or more. In addition, FIG. 21 exemplifies a case of providing nine local memories 10'_0 to 10'_8 and nine parallel computing unit 7'_0 to 7'_8.

In FIG. 21A, the local memories 10'_0 to 10'_8 are assigned so as to correspond to the parallel computing units 7'_0 to 7'_8 one to one. For example, the parallel computing unit 7' _0 is assigned to the local memory 10'_0 one-on-one. In this way, the parallel computing unit 7'_0 can use only the corresponding one local memory 10'_0. Incidentally, in this case, the local memory 10'_0 is equal to the local memory 10 in the parallel computing unit of FIG. 2.

In FIG. 21B, three local memories are collected to be one and are assigned to three parallel computing unit. For example, the local memories 10'_0 to 10'_2 are collected to be one and are assigned to three parallel computing units 7'_0 to 7'_2. A selector 510 is connected between one bundle of local memories and the corresponding parallel computing units 7'_0 to 7'_2. By the selector 51_0, any one of the parallel computing units 7'_0 to 7'_2 is connected to the local memories 10'_0 to 10'_2. This makes it possible to read the data stored in three local memories by any one of three parallel computing units 7'_0 to 7'_2. In other words, each of the three parallel computing units can use the triple memory capacity of the local memory. In this way, by having the configuration of bundling up the plural local memories to behave as one local memory and by distributing the data stored in three local memories, the memory capacity viewed from the parallel computing units can be increased.

The local memories 10'_0 to 10'_2 has been explained as an example, but other local memories are similar, too.

Each of the selectors 51_0 to 51_2 works so as to select or unselect in parallel the data of the number of bits equivalent to the number of product-sum operation units that configures the corresponding parallel computing unit. In other words, a bit width to be processed in parallel is very large in each of the selectors 51_0 to 51_2. Therefore, it is desired that the selectors 51_0 to 51_2 are configured by dedicated (exclusive) hardware. Of course, for example, the selector may be configured by a PE 3( ) or/and P-SW. The selectors 51_0 to 51_2 are controlled by the state transition management unit 6. In this way, for example, as showed in FIG. 21A, the present embodiment is programmed so that the local memory and the parallel computing unit become one-on-one and the parallel computing unit is connected to the local memory through the selector.

In FIG. 19, shown has been an example in which the state transition management unit 6 controls the product-sum operation units 11_0 to 11_$n$−1, the register 12, the selector 13, and the selectors 510 to 51_2, and selects the data supplied to the parallel computing units 7'_0 to 7'_5 among the data from the local memories 10'_0 to 10'_5. However, the present embodiment is not limited to this. For example, the present embodiment may have such a configuration as to provide the control unit in the parallel computing unit 7' and control the product-sum operation units 11_0 to 11_$n$−1, the register 12, the selector 13, and the selectors 51_0 t 51_2.

In addition, in FIG. 19, shown has been an example in which the local memory 10'_to 10'_5 and the parallel computing unit 7'_0 to 7'_5 are connected to one data bus 50, but the present embodiment is not limited to this. The data bus 50 may be divided into a plurality of data buses. For example, the data bus 50 may be divided into three data buses, and three local memories and three parallel computing units may be connected to each of the divided data buses. In other words, the local memories 10'_0 to 10'_2 and the parallel computing units 7'_0 to 7'_2 are connected to the first divided data bus; the local memories 10'_3 to 10'_5 and the parallel computing unit 7'_3 to 7'5 are connected to the second divided data bus; and the local memories 10'_6 to 10'_8 and the parallel computing units 7'_6 to 7'8 are connected to the third divided data bus. In this case, if the selector is structurally provided to each of the divided data buses, the configuration shown in FIG. 21B can be easily realized.

Controlling the selectors 51_0 to 51_2 by the state transition management unit 6 make it possible to dynamically change the connection between the local memories 10'_0 to 10'_8 and the parallel computing units 7'_0 to 7'_8 depending on situations of an application and a layer to be carried out. For example, by a lapse of time, it is possible to dynamically change from a state of the connection shown in FIG. 21B to a state of the connection shown in FIG. 21A.

Third Embodiment

Figure 22:
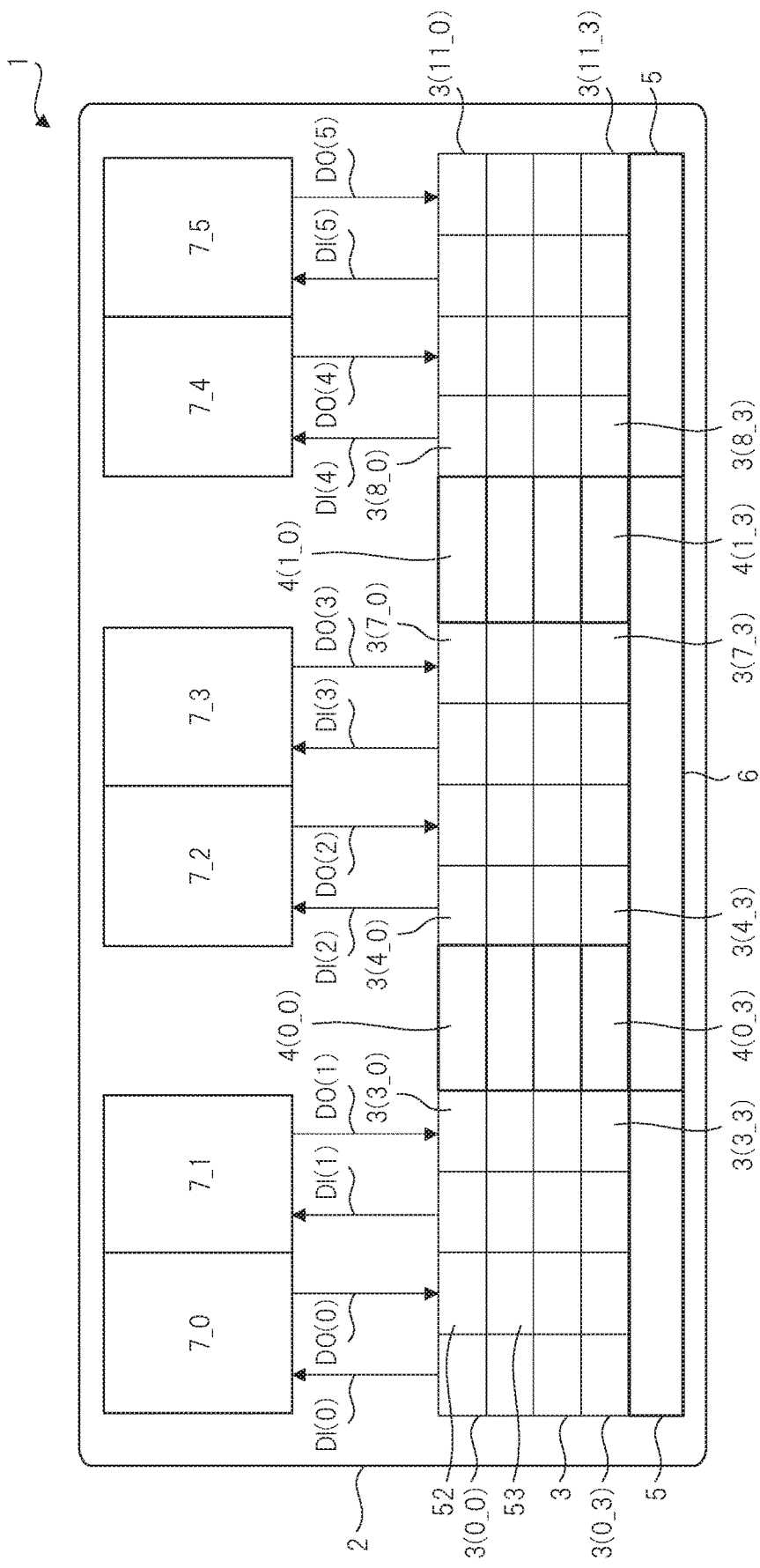
FIG. 22 is a block diagram showing a configuration of a semiconductor device according to a third embodiment.

FIG. 22 is a block diagram showing a configuration of a semiconductor device according to a third embodiment. Since FIG. 22 is similar to FIG. 1, a difference therebetween will be mainly explained.

In FIG. 1, the plural PEs 3( ) with the general arithmetic units have been arranged in the array 3. In contrast, in FIG. 22, the PEs 3 ( ) and the dedicated arithmetic units 52, 53 are arranged in the array 3. From a different angle, some of the plural PEs 3( ) arranged in the array 3 are replaced with the dedicated arithmetic units 52, 53. In addition, when the present embodiment is considered to be a data path, a data path includes both of the PE 3( ) and the dedicated arithmetic unit.

For example, in the deep learning processing, operations of fixed functions such as the above-mentioned BatchNorm processing and the activation processing are used heavily. These operations can be performed by a combination of general arithmetic unit and memory which the PE 3( ) has, but realizing the operations by the dedicated arithmetic units 52, 53 makes it possible to achieve improvement of processing speed. In addition, as compared with realization of the fixed function operations by a combination of a number of PEs, realization of the fixed function operations by one dedicated arithmetic unit makes it possible to make the number of PEs 3( ) to be arranged in the array 3 as shown in FIG. 22 less than that as shown in FIG. 1, so that the present embodiment is effective in area.

In FIG. 22, the dedicated arithmetic unit 52 shows a dedicated arithmetic unit that performs the operation of the BatchNorm processing, and dedicated arithmetic unit 53 shows a dedicated arithmetic unit that performs the operation the activation processing. In addition, in FIG. 22, shown is an example in which two dedicated arithmetic units are arranged in the array. However, the number of dedicated arithmetic units and their placement are not limited to this.

Figure 23:
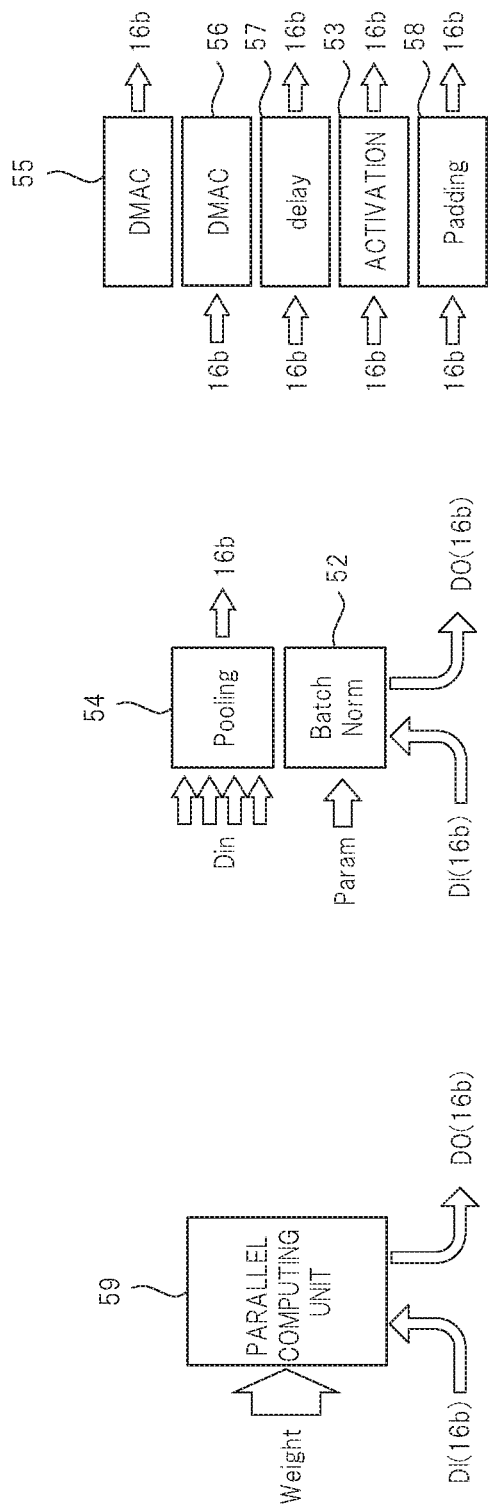
FIG. 23 is a view showing an example of a dedicated arithmetic unit according to the third embodiment.

An example of a dedicated arithmetic unit mountable on the array 3 will be explained with reference to the drawings. FIG. 23 is a view showing an example of a dedicated arithmetic unit according to the third embodiment.

In the deep learning processing, a pooling processing or a padding processing is also carried out besides the BatchNorm processing and the activation processing. In FIG. 23, the reference numeral 54 shows a dedicated arithmetic unit that perform an operation about the pooling. The dedicated arithmetic unit 54 performs the operation about the pooling processing with respect to the input data Din, and outputs 16-bit wide data. Reference numeral 58 shows a dedicated arithmetic unit that performs a processing about the padding, inputs 16-bit wide data, performs the operation, and outputs the 16-bit wide data. In a case of, for example, no padding, the dedicated arithmetic unit 58 performs a processing of inserting a value of 0 into the data regularly. The dedicated arithmetic unit 52 that performs the operation about the BatchNorm processing carries out an operation with respect to a parameter and a 16-bit wide input Din, and outputs 16-bit wide data Dout. Furthermore, the dedicated arithmetic unit 53 that performs the operation about the activation processing inputs 16-bit wide data, and outputs the 16-bit wide data.

In addition, the DMAC which performs data transmission with, for example, the external memory 30 (FIG. 6) can be also arranged as the dedicated arithmetic units 55, 56 in the array 3. Furthermore, the delay function part 47 explained in FIG. 14 etc. can be also placed as the dedicated arithmetic unit 57 in the array 3.

The parallel computing unit 59 can be placed as one dedicated arithmetic unit in the array 3.

The arithmetic unit is not limited to the dedicated arithmetic unit exemplified in FIG. 22, and can be placed as a dedicated arithmetic unit in the array 3 and made an element of the data path as long as performing an operation of inputting and outputting the small number of pieces of data. Use of the dedicated arithmetic unit makes it possible to perform the processing more effectively than realization of the arithmetic unit by the combination of the general arithmetic units and to be arranged effectively. However, since the dedicated arithmetic unit is usable only for its purpose, an arithmetic unit that, as targets, corresponds to a processing with high occurrence frequency or that has high effects in speed and occupation area by being dedicated is desirable made a dedicated arithmetic unit. The dedicated arithmetic unit as a target other than the above-mentioned target can be desirably realized by a combination of the PEs etc.

The dedicated arithmetic unit arranged in the array 3 is connected to a data bus through the P-SW similarly to the PE 3(1_1) shown in FIG. 4. This state of the P-SW is controlled by the state transition management unit 6. This makes it possible to use any dedicated arithmetic unit.

Fourth Embodiment

In a fourth embodiment, an arrangement example of the array type processor on a semiconductor device.

Figure 24:
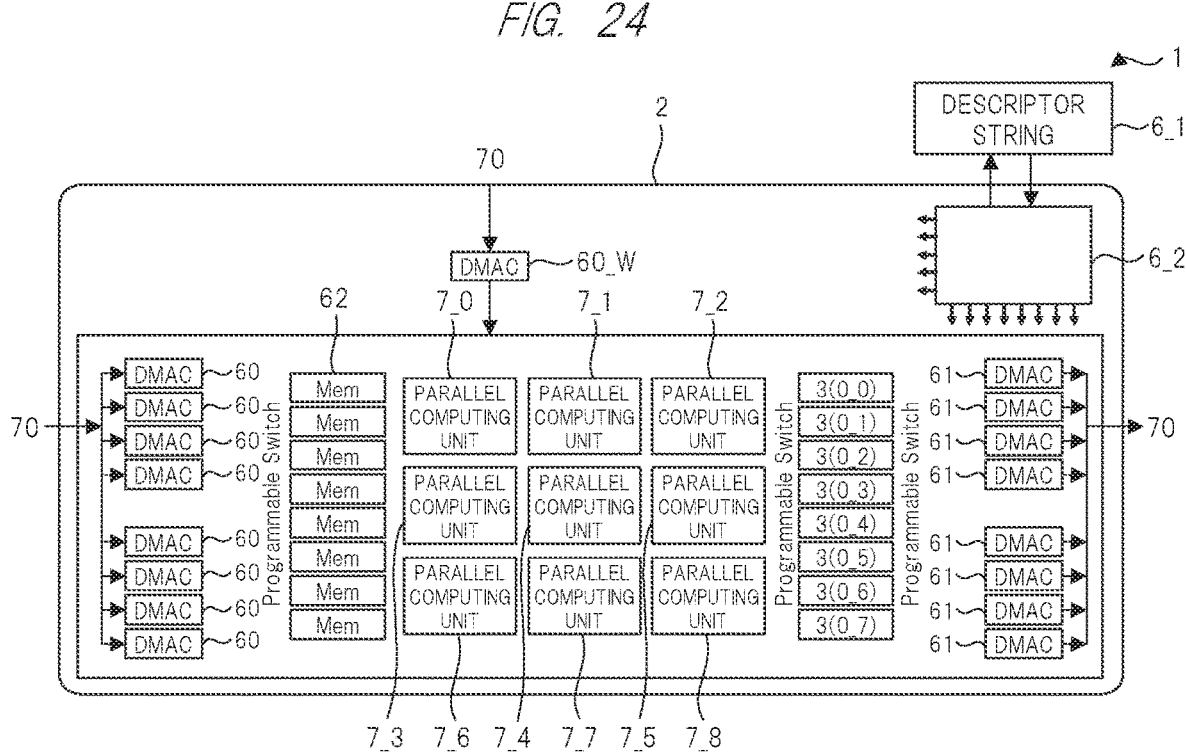
FIG. 24 is a plan view showing arrangement of semiconductor chips in an array type processor according to a fourth embodiment.

FIG. 24 is a plan view showing arrangement of semiconductor chips in an array type processor according to a fourth embodiment. FIG. 24 shows arrangement suitable to a case where the operation performance of the parallel computing unit decides performance of an application as a target of the processing carried out by the array type processor 2. In FIG. 24, each of the reference numerals 7_0 to 7_8 show parallel computing units as explained in FIGS. 1 and 2, etc.

In the fourth embodiment, since the operation performance of the parallel computing unit is important, a connection relation between the parallel computing units is weighed and arranged. In other words, the parallel computing units 7_0 to 7_11 are arranged into array form in FIG. 24 in the vicinity of a central part of the array type processor 2 so as to be close to a mutual space (gap) between the parallel computing units. In FIG. 24, the reference numerals 60, 61 show DMACs, and the reference numeral 62 shows a memory, and the reference numerals 3(0_0) to 3(0_7) shows PEs. In addition, in the same figure, a programmable switch shows a switch group for connecting each of the DMACs 60, 61, memory 62, parallel computing unit 7, and PE 3( ) to the data bus. In other words, these switch groups are the above-mentioned group of P-SWs.

The memory 6_1 configuring the state transition management unit 6 is placed outside the array type processor 2 and the management unit 6_2 is arranged inside the array type processor 2 although both are not limited in particular. The array type processor 2 is connected to an external memory such as the external memory 30 (FIG. 6) through the data bus 70.

The DMACs 60, 61 and memory 62 shown in FIG. 24 are provided to the circuit block 5 shown in FIG. 1. The DMAC denoted by the reference numeral 60_W among the DMACs 60 is a DMAC that transfers the data to local memories 10 (FIG. 2) of the parallel computing units 7_0 to 7_8 from the data bus 70. Since the data stored in the local memory 10 is weight data in the deep learning processing, the DMAC 60_W leads to transferring the weight data.

The DMAC 60 transfers, to the array type processor 2, the input data supplied from the external memory 30 through the data bus 70, and the DMAC 61 transfers a processing result(s) of the array type processor 2 to the external memory 30 through the data bus 70.

A descriptor string that is configured by the plural descriptors is stored in the memory 6_1, and is read to the management unit 6_2 sequentially. In this way, the management unit 6_2 outputs a state signal according to the read descriptor. According to the outputted state signal, the configuration of the data path is prescribed, and the processing is performed to the input data that is obtained from the external memory 30 supplied to the array type processor 2, and its processing result is supplied to the external memory 30.

To collect the important parallel computing units and arrange them into array form has been mentioned, but that an element having a strong connection relation with the parallel computing unit is arranged near the parallel computing unit is also important. Therefore, the PE 3( ) and the memory 62, each of which has a strong connection relation with the parallel computing unit, are arranged closer to the array of the parallel computing unit than the DMACs 61, 60.

In FIG. 24, shown has been an example of collecting the important parallel computing units and arranging them into array form in order to shorten a mutual distance. However, it is desired to set each arrangement in consideration of importance of the connection relation, and areas and the number, etc. of respective elements also regarding other elements such as PEs. For example, in FIG. 22, the plural PEs 3( ) are arranged in the array 3. However, in the array 3, only the PEs 3( ) are not arranged collectively and the PEs are arranged so as to sandwich the arithmetic circuit 4(0_0) to 4(1_3), dedicated arithmetic units 52, 53 between the PEs 3( ). In this way, each distance between the PEs 3( ) and the arithmetic circuits 4(0_0) to 4(1_3) and dedicated arithmetic units 52, 53 is suppressed so as not to be far.

First Modification

Figure 25:
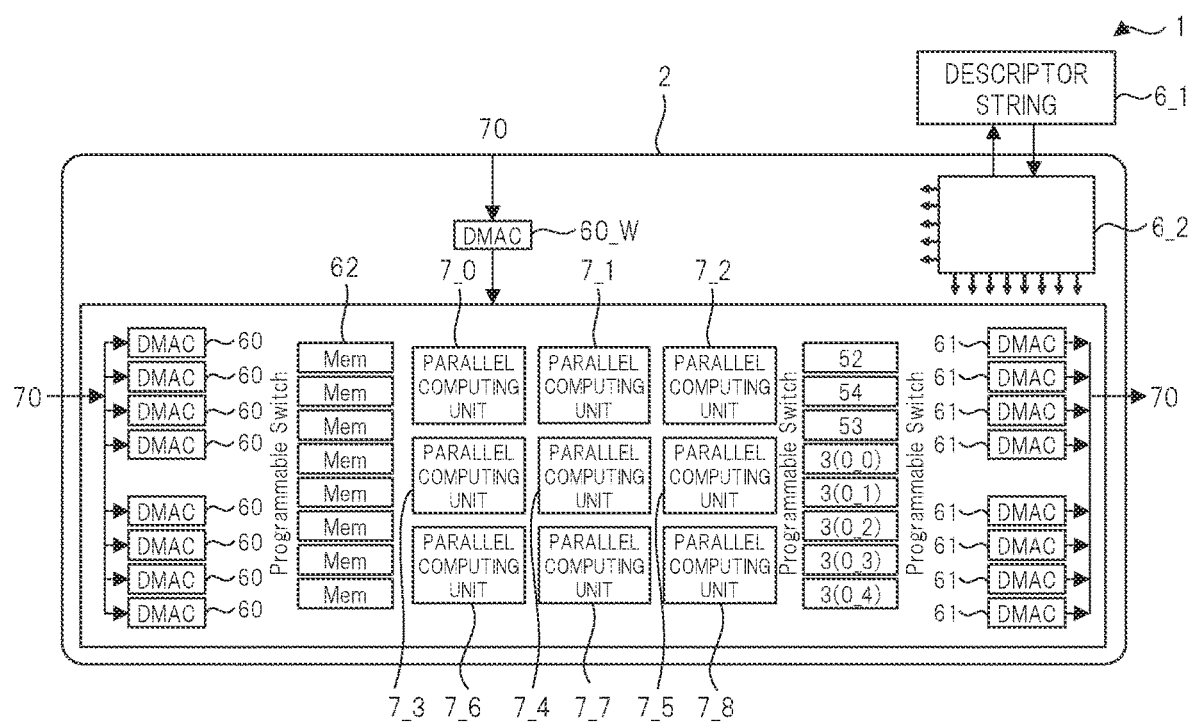
FIG. 25 is a plan view showing arrangement of an array type processor according to a first modification of the fourth embodiment.

FIG. 25 is a plan view showing arrangement of an array type processor according to a first modification of the fourth embodiment. Since FIG. 25 is similar to FIG. 24, a difference therebetween will be mainly explained.

The difference is to reduce the number of PEs 3( ) having the general arithmetic units and increase the number of dedicated operation units in order to improve processing efficiency of processing parts other than the parallel computing unit 7. In other words, the dedicated arithmetic units 52, 53 shown in FIG. 23 are added to the array type processor 2, and the number of PEs is reduced up to 3(0_0) to 3(0_4). In this way, the contents capable of being handled by the array type processor 2 have been specialized, and the processing efficiency of the suitable application can be improved.

Second Modification

Figure 26:
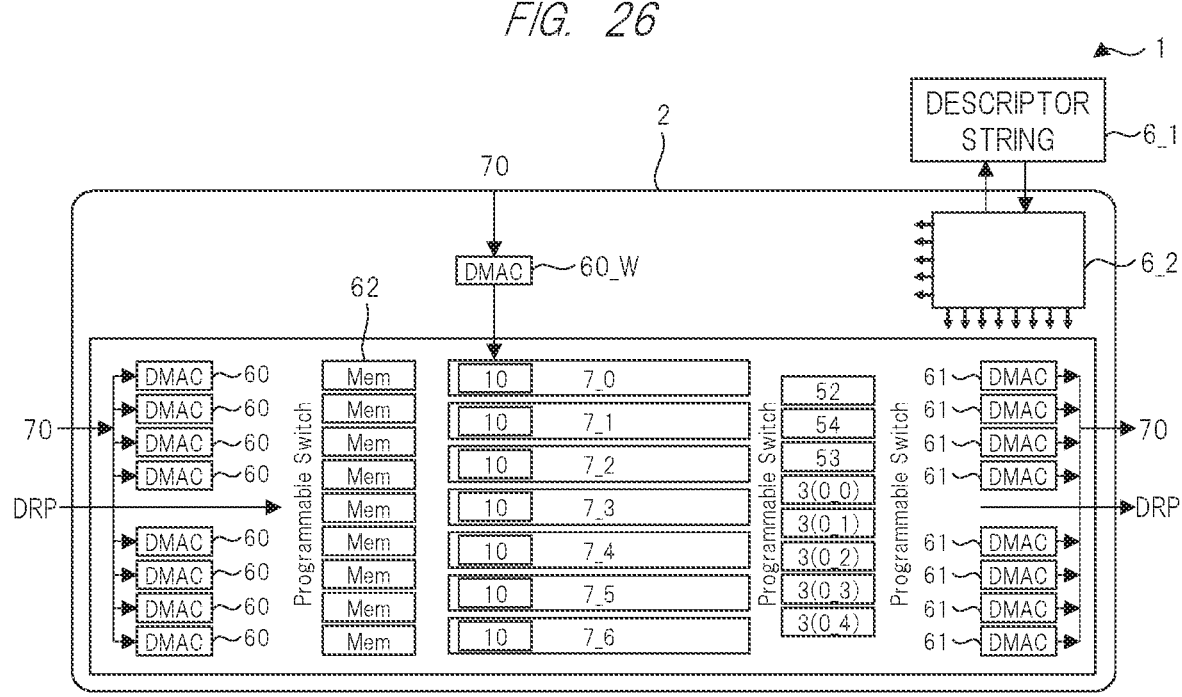
FIG. 26 is a plan view showing arrangement of an array type processor according to a second modification of the fourth embodiment.

FIG. 26 is a plan view showing arrangement of an array type processor according to a second modification of the fourth embodiment. Since FIG. 26 is similar to FIG. 25, a difference therebetween will be mainly explained.

The difference is that the parallel computing unit is not arranged into array form but is arranged into line form in the vicinity of the central part of the array type processor 2. In addition, the number of parallel computing units becomes less than that shown in FIG. 25. This arrangement is suitable to a case where the number of parallel computing units is relatively little. In addition, this arrangement is suitable to a case where a large number of signals are sent and received between the adjacent parallel computing units. For example, basic of the parallel computing unit is to have few data input and output, but parallel data inside each parallel computing unit can be transferred as a number of signals mentioned above at the same time only between the adjacent parallel computing units. This makes it possible to add at once the product-sum operation results computed by dividing the plural parallel arithmetic units, collect them, and obtain one product-sum operation result. Incidentally, in FIG. 26, local memories included in the parallel computing unit 7_0 to 7_6 are shown clearly.

In addition, in FIG. 26, another array type processor DRP provided outside the array type processor 2 is connected to a bus in the data path through a programmable switch. As explained in FIG. 25, in the array type processor 2, the dedicated arithmetic unit is increased in number and the PE 3( ) is reduced in number. Therefore, it is thought that the processing uncapable of being realized or the processing bringing low performance by the dedicated arithmetic unit occurs.

In the second modification, the processing uncapable of being realized or the processing bringing low performance by the dedicated arithmetic unit is implemented by the array type processor DRP provided outside. The result handled by the array type processor DRP is supplied to the data bus in the data path through the programmable switch. In addition, the data is supplied from the data bus in the data path to the array type processor DRP through the programmable switch in order to let the array type processor DRP perform the processing. In other words, the sending and receiving of the data are carried out between the array type processor DRP and the array type processor 2 without using the DMACs 60, 61. This makes it possible to achieve the improvement of the processing speed.

Of course, by using the DMACs 60, 61, the data may be transferred between the external memory and the array type processor 2 or the data may be transferred between the external memory and the array type processor 2 and between the external memory and the array type processor DRP after storing the data in the external memory once.

In addition, for example, an input side FIFO and an output side FIFO may be provided to the array type processor. In this case, the data from the array type processor DRP is inputted into the input side FIFO, and are transferred to the data bus in the data path from the input side FIFO. In addition, the data from the data bus in the data path is transferred to the output side FIFO, and is supplied to the external memory 30 from the output side FIFO.

Third Modification

Figure 27:
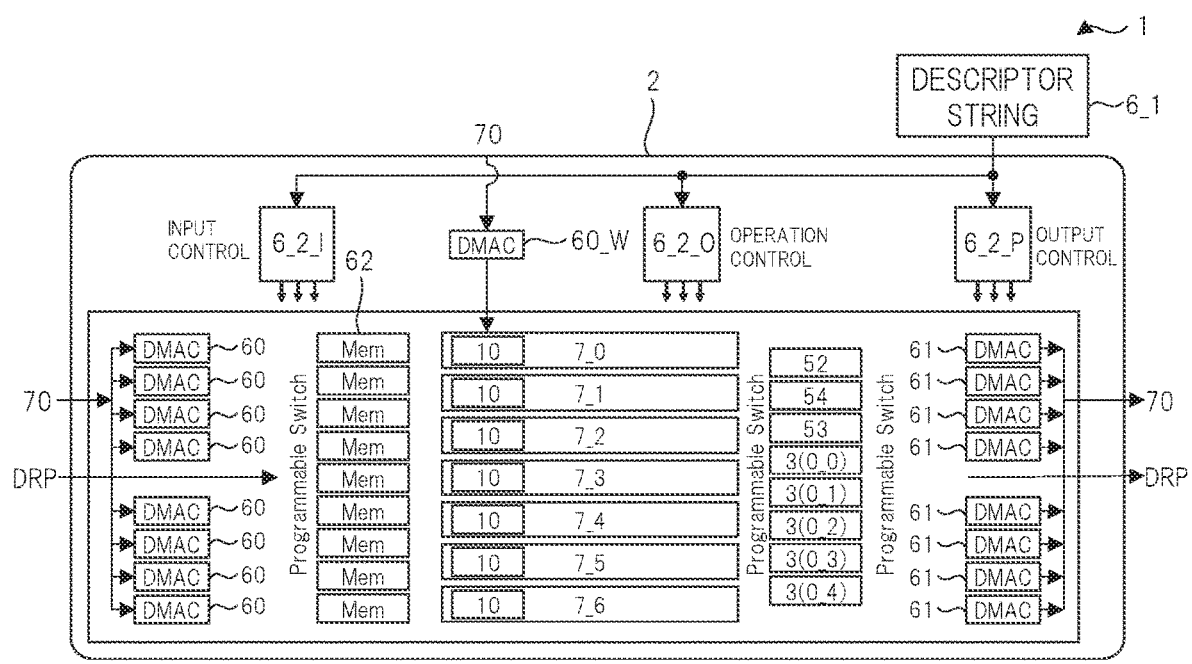
FIG. 27 is a plan view showing arrangement of an array type processor according to a third modification of the fourth embodiment.

FIG. 27 is a plan view showing arrangement of an array type processor according to a third modification of the fourth embodiment. Since FIG. 27 is similar to FIG. 26, a difference therebetween will be mainly explained.

The difference is that the management unit 62 configuring the state transition management unit 6 is divided into a plural number. In the third modification, the management unit is divided for each function block of the array type processor 2. In other words, the management unit 62 is divided into three of: a management unit 6_2-I controlling an input of data; a management unit 6_2-O controlling an operation; and a management unit 6_2-P controlling an output of data. The same descriptor is supplied to the management units 6_2-I, 6_2-O, 6_2-P from the memory 6_1, and the management unit 6_2-I forms a state signal for controlling the input. In addition, the management unit 6_2-O forms a state signal for controlling the operation, and the management unit 6_2-P forms a state signal for controlling the output. In other words, the management unit, which corresponds to each of the input control, operation control, and output control, controls them according to the descriptor.

In this way, since each of the data input, operation, and data output can be performed in any different timing, a case etc. of performing a pipeline operation between these functions becomes effective. In other words, in the third modification, the management unit 6_2 is divided into a plurality of management units 6_2-I, 6_2-O, 6_2-P depending on timing of an internal operation of the array type processor 2.

In FIG. 27, explained have been an example in which the parallel computing units 7 are arranged into line form and the dedicated arithmetic unit is added. However, from the viewpoint of dividing the management unit, the parallel computing unit may be arranged into array form as shown in FIG. 24. In addition, the dedicated arithmetic unit may not be added.

Fourth Modification

Figure 28:
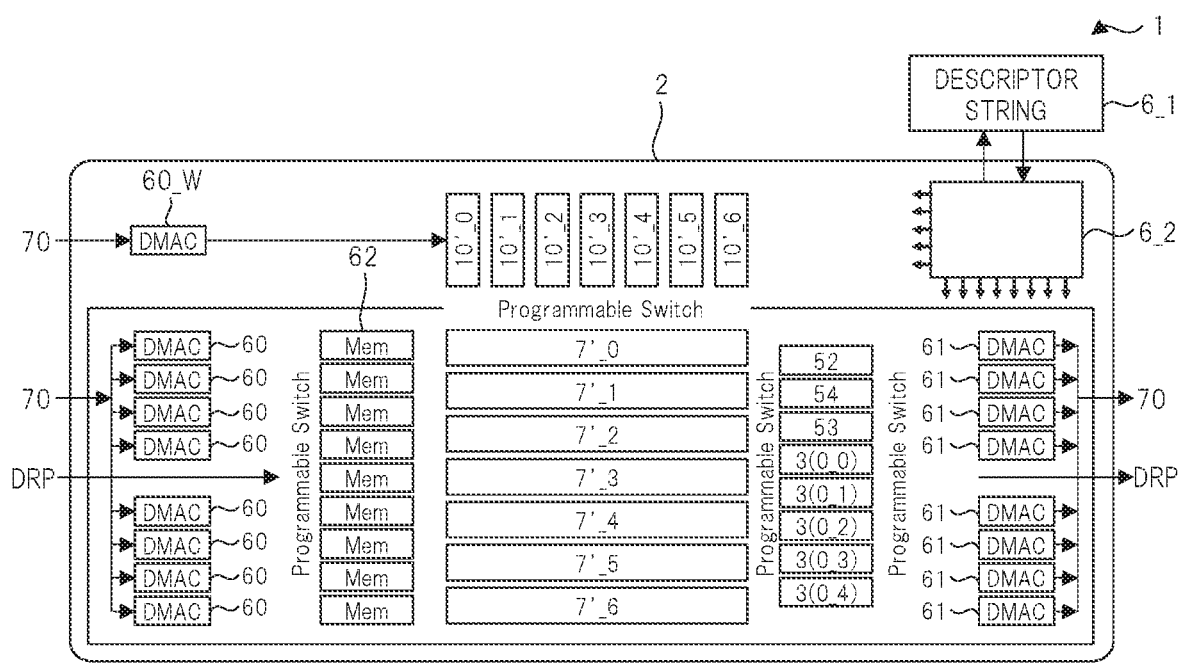
FIG. 28 is a plan view showing arrangement of an array type processor according to a fourth modification of the fourth embodiment.

FIG. 28 is a plan view showing arrangement of an array type processor according to a fourth modification of the fourth embodiment. Since FIG. 28 is similar to FIG. 26, a difference therebetween will be mainly explained.

In the fourth modification, as explained in the second embodiment, explained will be a case of arranging the local memory outside the parallel computing unit. In other words, for the parallel computing unit, the local memory 10 used as an input of weight is collectively arranged as local memories 10'_0 to 10'_6 outside the parallel computing units 7'_0 to 7'_6. In the example shown in FIG. 28, a programmable switch with the plural P-SWs is arranged between the collectively arranged local memories 10'_0 to 10'_6 and parallel computing units 7'_0 to 7'_6. A large number of signal lines needs to be connected by the programmable switch between the local memories 10'_0 to 10'_6 and the parallel computing units 7'_0 to 7'_6, so that it is desired to have a configuration of arranging the local memories 10'_0 to 10'_6 and the parallel computing units 7'_0 to 7'_6 based on a position relation of easy wirings or of hardly damaging physical design by limitation of a freedom degree of the connection.

In FIG. 28, the number of parallel computing units 7'_0 to 7'_6 is the same as the number of local memories 10'_0 to 10'_6. Therefore, each of the parallel computing units 7'_0 to 7'_6 can use the data corresponding to each parallel computing unit in performing an operation.

When the plural parallel arithmetic units use the common data in performing the operation, the programmable switch is switched by the state transition management unit 6 so as to connect the common local memory to a plurality of parallel operations. In addition, in this case, the reduction in power consumption is achieved by stopping the operation of the local memory which does not read the data. In addition, as explained in FIG. 21 of the second embodiment, the programmable switch is switched by the state transition management unit 6 so as to collect the plural local memories to one and behave as one local memory, so that it is also possible to fully handle usable memory capacity without stopping the operation of the local memory and to enlarge a scale of realizable processings.

Fifth Modification

Figure 29:
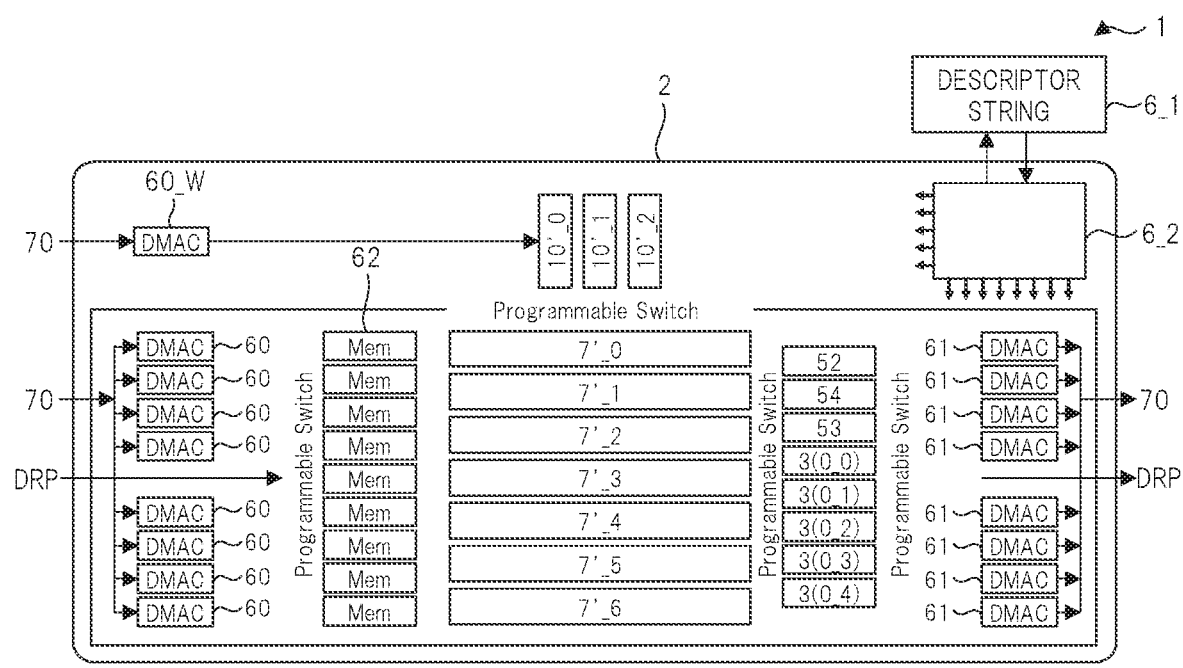
FIG. 29 is a plan view showing arrangement of an array type processor according to a fifth modification of the fourth embodiment.

FIG. 29 is a plan view showing arrangement of an array type processor according to a fifth modification of the fourth embodiment. Since FIG. 29 is similar to FIG. 28, a difference therebetween will be mainly explained.

The difference is that the number of local memories becomes little. In other words, in the example of FIG. 29, the number of parallel computing units 7'_0 to 7'_6 arranged in the array type processor 2 is seven, whereas the number of local memories is three (10'_0 to 10'_2) less than it.

In the fourth modification, the local memories 10'_0 to 10'_6 corresponding the respective parallel arithmetic units 7'_0 to 7'_6 are provided in advance. Therefore, it has been possible to connect the parallel computing unit and the local memory one-on-one and to achieve the reduction in power consumption by stopping the operations of some of the local memory. In addition, it has been possible to increase the memory capacity, which the parallel computing unit can use, by collecting the plural local memories and by connecting the collected local memories to one parallel computing unit.

However, if the parallel computing unit unnecessary for the local memory proves to be present in advance, it is possible to achieve reduction in area and/or power consumption by reducing the number of local memories as shown in FIG. 29. In the case of FIG. 29, each memory capacity of the local memories 10'_0 to 10'_2 may be the same as the memory capacity of the local memory shown in FIG. 28, or may be, for example, larger. In maintaining each memory capacity of the local memories 10'_0 to 10'_2 of FIG. 29, it is possible to achieve the reduction in area or/and power consumption, and in increasing the memory capacity, it is possible to enlarge feasible processing scale. In addition, it is possible to achieve simplification of the local memories 10'_0 to 10'_2 and the parallel computing unit and simplification of the programmable switch by reducing the number of local memories.

Fifth Embodiment

Figure 30:
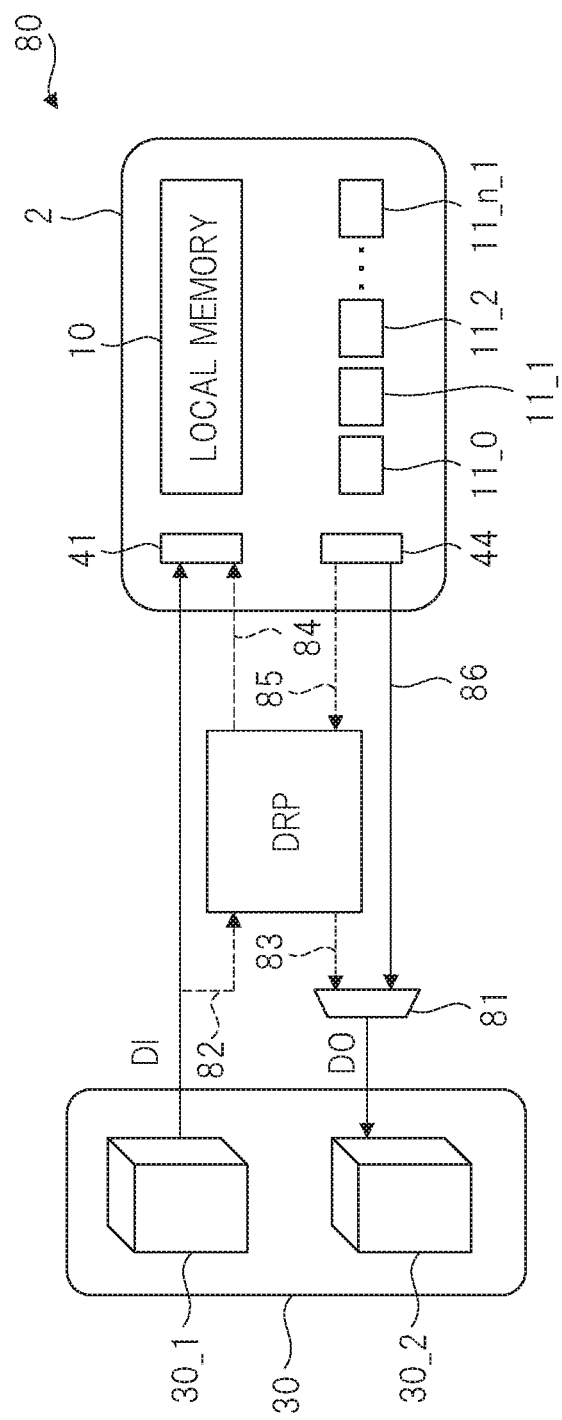
FIG. 30 is a block diagram showing a configuration of a processing system according to a fifth embodiment.

In a fifth embodiment, explained will be a processing system of using the array type processor 2 explained in the first to fourth embodiments and another array type processor provided outside the array type processor 2. FIG. 30 is a block diagram showing a configuration of a processing system according to a fifth embodiment. In FIG. 30, the reference numeral 80 shows a processing system. The processing system 80 includes an array type processor 2, an array type processor DRP different from the array type processor 2, a selector 81, and an external memory 30. Incidentally, in this processing system 80, the array type processors 2, DRP and the selector 81 are formed in one semiconductor chip, and they may be configured as one semiconductor device.

Herein, explained will be a case where the array type processors explained in the first and third embodiments are used as the array type processor 2. In addition, only the local memory 10, product-sum operation units 11_0 to 11_$n$−1, and DMACs 41, 44 among the circuit blocks included in the array type processor 2 are illustrated in FIG. 30 in order to avoid the drawing being complicated. As mentioned with reference to FIGS. 1, 2, and 10, the local memory 10 and the product-sum operation units 11_0 to 11_$n$−1 shown in FIG. 30 correspond to the local memory and the product-sum operation units included in the parallel computing unit 7_0 shown in FIG. 2. In addition, the DMACs 41, 44 shown in FIG. 30 correspond to the DMACs included in the circuit block 5 shown in FIG. 1. In this case, as showed in FIG. 10, the DMAC 41 functions to transfer the input data to the parallel computing unit, and the DMAC 44 functions to transfer the output data. In addition, although being not shown in FIG. 30, the array type processor 2 includes the dedicated operation unit explained in FIG. 22.

The external memory 30 includes a first memory area 30_1 for storing the input data DI, and a second memory area 30_2 for storing the output data DO of the handled result. The output data DO is formed by carrying out a predetermined processing with respect to the input data DI. However, in the fifth embodiment, this determined processing is distributed (dispersed) by the array type processors 2, DRP. In other words, the predetermined processing is carried out by combining the array type processors 2, DRP.

In the fifth embodiment, the array type processor 2 is configured so as to include the parallel computing unit 7, the dedicated operation unit, and the necessary minimum PEs 3( ) in order to make the processing efficiency of the basic processing among the predetermined processings good. On the other hand, the processing not to be performed by the array type processor 2 among the predetermined processings make the array type processor DRP carried out.

A specific processing example will be explained. In a case of the basic processing, the DMAC 41 transfers the input data DI in array type processor 2, and processing for the input data DI into the array type processor 2, and the processing to the input data DI is carried out inside the array type processor 2. Its result is supplied as data 86 to the selector 81 by the DMAC 44, and is stored in the second memory area 30_2 through the selector 81.

In a case of the processing not to be handled by the array type processor 2, the input data DI is supplied to the array type processor DRP. In the array type processor DRP, for example, a preprocessing is carried out with respect to the supplied input data, and the data 84 formed by the preprocessing is transferred in the array type processor 2 by the DMAC 41, and is processed in the array type processor 2. In a case of further performing a post-processing not to be handled by the array type processor 2 with respect to the result handled in the array type processor 2, the handled data 85 is transferred to the array type processor DRP by the DMAC 44, and the array type processor DRP performs the post-processing to the data 85 and stores its result in the memory area 30_2 as the output data DO through the selector 81 as the data 83.

In addition, for data 82, in a case of the processing not to be handled by the array type processor 2 and not to be need interposition of the array type processor 2, the array type processor DRP performs the processing to the data 82, outputs its result to the selector 81 as the data 83, and stores it in the second memory area 302 as the output data DO from the selector 81. In this case, for example, the processing may be performed by transferring, to the first memory area 30_1, the output data stored in the second memory area 30_2 and supplying as input data DI it to the array type processor 2 again.

This makes it possible to provide the processing system 80 which has both of processing performance and general versatility.

Incidentally, which of the array type processor 2 and the array type processor DRP is in charge of the processing is determined by the program that each array type processor carries out. In addition, which of data 83 and data 85 the selector 81 selects is determined by the program which the array type processor 2 or DRP performs.

In FIG. 30, shown has been an example in which the external memory 30 has the first memory area 3_1 and the second memory area 30_2. However, these memory areas may be the same area. In addition, in the array type processor 2, explained has been an example of using the DMACs 41, 44 to transfer the data. However, the present embodiment is not limited to this. In other words, as explained in FIG. 26, the data may be transferred between the data bus in the data path of the array type processor 2 and the array type processor DRP without using the DMAC, and may be transferred by using the input side FIFO and the output side FIFO.

Sixth Embodiment

In a sixth embodiment, a plurality of processings are carried out in one array type processor.

Figure 31:
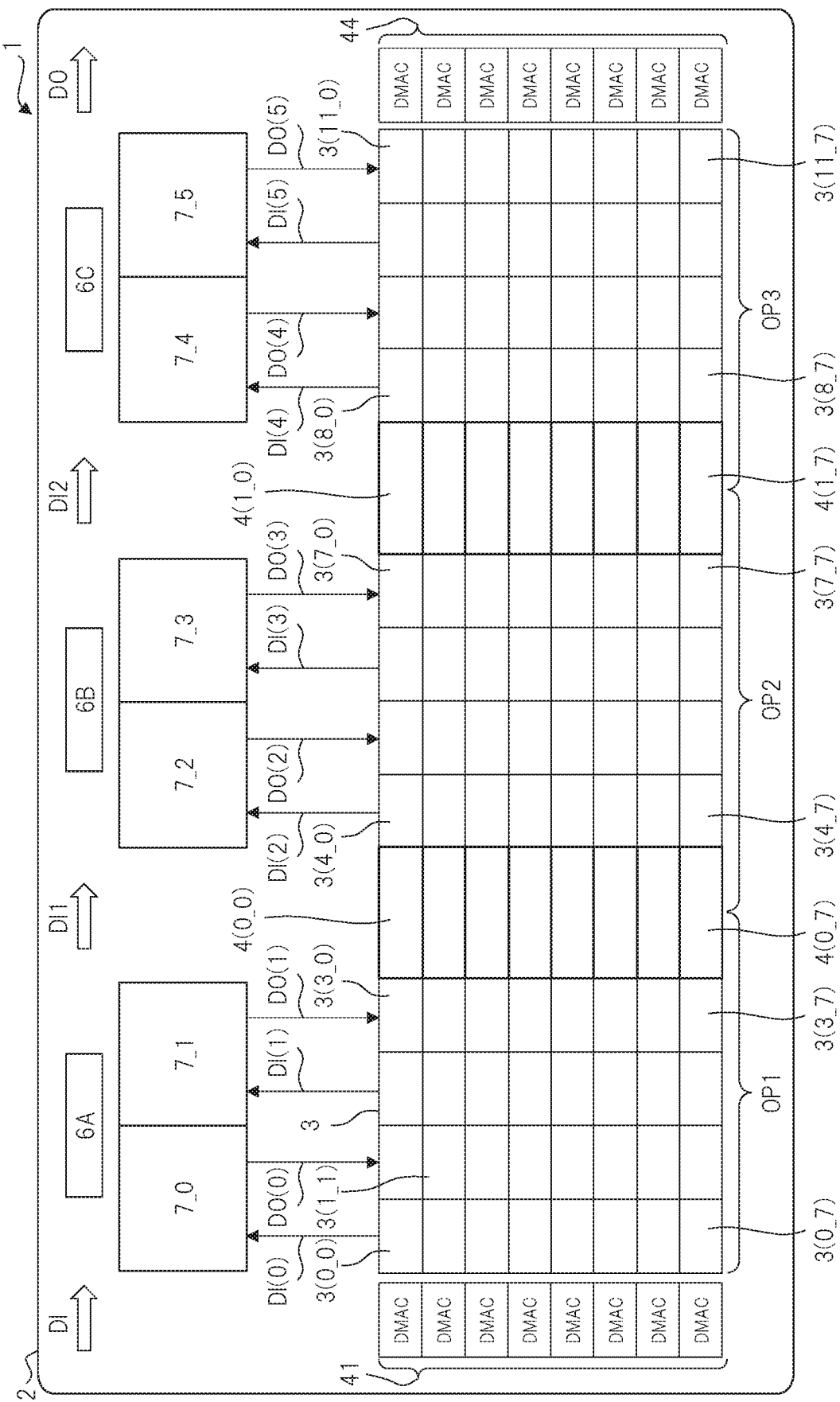
FIG. 31 is a block diagram showing a configuration of an array type processor according to a sixth embodiment.

FIG. 31 is a block diagram showing a configuration of an array type processor according to a sixth embodiment. Since FIG. 31 is similar to FIG. 1, a difference therebetween will be mainly explained. In addition, explained as the plural processings performed by one array type processor will be an example of the processings of the neural network structure shown in FIG. 5.

The difference obtained by comparing FIG. 31 with FIG. 1 is that the DMAC included in the circuit block 5 is clearly indicated as the DMACs 41, 44 in FIG. 31. In addition, the state transition management unit 6 is configured by first to third state transition management units (hereinafter, also called unitary state transition management unit) 6A to 6C. the array 3 is divided into three arrays OP1, OP2, OP3. In other words, the data path is divided into three so as to correspond to the three arrays OP1, OP2, OP3. The first state transition management unit 6A controls the divided data path corresponding to the parallel computing units 7_0, 7_1 and the array OP1; the second state transition management unit 6B controls the divided data path corresponding to the parallel computing units 7_2, 7_3 and the array OP2; and the third state transition management unit 6C controls the divided data path corresponding to the parallel computing units 7_4, 7_5 and the array OP3.

The first state transition management unit 6A controls the parallel computing units 7_0, 7_1 so as to perform a processing such as activation of the first layer shown in FIG. 5 and a processing of a product-sum operation before the first layer by the corresponding parallel computing units 7_0, 7_1 and array OP1, and prescribes a configuration of the divided data path corresponding to the array OP1. In addition, the second state transition management unit 6B controls the parallel computing units 7_2, 7_3 so as to perform a processing such as activation of the second layer shown in FIG. 5 and a processing of a product-sum operation before the second layer by the corresponding parallel computing units 7_2, 7_3 and array OP2, and prescribes a configuration of the divided data path corresponding to the array OP2. Furthermore, the third transition management unit 6C controls the parallel computing units 7_4, 7_5 so as to perform a processing such as activation of the output layer shown in FIG. 5 and a processing of a product-sum operation before the output layer by the corresponding parallel computing units 7_4, 7_5 and array OP3, and prescribes a configuration of the divided data path corresponding to the array OP3.

In this way, for the input data DI transferred into the array type processor 2 from the external memory 30 by the DMAC 41, the processing of the first layer and the processing of the product-sum operation before it lead to being performed by the divided data path corresponding to the parallel computing unit 7_0, 7_1 and array OP1 corresponding to the first state transition management unit 6A. For the data DI1 to which the processing of the first layer is subjected, a processing of the second layer and a processing of the product-sum operation before it then lead to being performed by the divided data path corresponding to the parallel computing unit 7_2, 7_3 and array OP2 corresponding to the second state transition management unit 6B. Furthermore, for the data DI2 to which the processing of the second layer is subjected, the processing of the output layer and the processing of the product-sum operation before it lead to being performed by the divided data path corresponding to the parallel computing unit 7_4, 7_5 and array OP3 corresponding to the third state transition management unit 6C. The DMAC 44 transfers, as the output data DO, the data DI2 to the external memory 30.

In this way, for the input data DI transferred from the external memory 30, the processing of the neural network structure shown in FIG. 5 is sequentially performed in the array type processor 2, and its result leads to being transferred to the external memory 30. In the array type processor 2, the processing leads to being performed in a pipeline manner by continuously transferring the input data DI from the external memory 30. For example, in a period of time when the processing of the output layer and the processing of the product-sum operation before it are performed in the parallel computing units 7_4, 7_5 and array OP3 corresponding to the third state transition management unit 6C, the processing of the second layer and the processing of the product-sum operation before it lead to being performed to the data inputted at the next timing in the parallel computing units 7_2, 7_3 and array OP2 corresponding to the second state transition management unit 6B. In other words, in the array type processor 2, the plural processings related to the different layers are performed so as to overlap temporally. Therefore, the reduction in processing time can be achieved.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A semiconductor device comprising:
a data path including a plurality of processor elements;
a state transition management unit that outputs a state signal to the data path, wherein the state signal includes state information of the data path indicating operation contents of the plurality of processor elements of the data path, and wherein the plurality of processor elements of the data path is configured based on the operation contents in the state information of the data path to generate first data using the plurality of processor elements of the data path; and
an arithmetic processor including a plurality of parallel computing units and a delay function processor,
wherein each of the plurality of parallel computing units comprises:
an input line group that i) is connected to the data path and ii) receives, from the data path, the generated first data;
a local memory that stores second data different from the received first data;
a plurality of arithmetic units that i) receives the first data from the input line group and the second data from the local memory, and ii) performs an operation between the first data and the second data;
a register that stores operation results of the plurality of arithmetic units; and
a selector that selects one operation result out of the operation results stored in the register and outputs the selected operation result to the data path via an output line group; and
the output line group that i) is connected to the data path and ii) outputs the selected operation result from the selector to the data path,
wherein the delay function processor delays transferring the first data from the data path to the input line group for at least one of the plurality of parallel computing units,
wherein the data path, the plurality of processor elements, and the state transition management unit are located outside of the parallel computing unit while at least the plurality of arithmetic units is located within the parallel computing unit, and
wherein the state transition management unit is configured to fix a configuration of the data path over a plurality of cycles for inputting or outputting the data.

2. The semiconductor device according to claim 1, wherein the data path further comprises a dedicated arithmetic unit whose function is fixed, and
the plurality of processor elements has a general arithmetic unit changing operation contents.

3. The semiconductor device according to claim 1, wherein the state transition management unit reads, from a memory, a descriptor prescribing the state of the data path, and transitions the state of the data path according to the read descriptor.

4. The semiconductor device according to claim 3, wherein the state of the data path is prescribed by a plurality of descriptors different from each other.

5. The semiconductor device according to claim 4, further comprising a plurality of DMA controllers,
wherein the plurality of DMA controllers operates so as to send and receive data between an external memory and the data path.

6. The semiconductor device according to claim 1, wherein the data path includes a switch connected between each of the plurality of processor elements and a data bus,
each of the plurality of processor elements includes a general computing unit and a management memory,
a plurality of pieces of state information prescribing states of the general computing unit and the switch are stored in the management memory, and
predetermined information is designated from the plurality of pieces of state information stored in the management memory.

7. The semiconductor device according to claim 6, wherein the state transition management unit reads a descriptor from a memory, and designates state information corresponding to the read descriptor from the plurality of pieces of state information.

8. The semiconductor device according to claim 6, wherein the state transition management unit includes a plurality of unitary state transition management units, and
wherein the plurality of unitary state transition management units designate a different state with respect to a corresponding data path.

9. A control method of a semiconductor device,
wherein the semiconductor device comprises:
a data path including i) a plurality of processor elements and ii) a switch connected to each of the plurality of processor elements;
a state transition management unit managing a configuration of the data path; and
an arithmetic processor including a plurality of parallel computing units and a delay function processor,
wherein each of the plurality of parallel computing units comprises i) an input line group connected to the data path, ii) a plurality of arithmetic units connected to the input line group, iii) a local memory connected to the plurality of arithmetic units, iv) a register connected to the plurality of arithmetic units, v) a selector connected to the register, and vi) an output line group connected to the selector and the data path, wherein the data path, the plurality of processor elements, and the state transition management unit are located outside of the parallel computing unit while at least the plurality of arithmetic units is located within the parallel computing unit, wherein the control method comprises:
- transmitting, from the state transition management unit to the data path, a first state signal including first state information of the data path indicating first operation contents of the plurality of processor elements of the data path such that the plurality of processor elements of the data path is configured based on the operation contents in the first state information of the data path;
- generating, using the plurality of processor elements of the data path configured based on the first state information, first data;
- outputting the generated first data from the data path to the input line group of the parallel computing unit;
- performing, using the plurality of arithmetic units of the parallel computing unit, an operation between the first data generated by the plurality of processor elements and second data stored in the local memory, the second data being different from the first data generated by the plurality of processor elements;
- storing, in the register, operation results of the plurality of the arithmetic units;
- selecting, using the selector, one operation result out of the operation results stored in the register; and
- outputting the selected operation result to the data path via the output line group, wherein the delay function processor delays transferring the first data from the data path to the input line group for at least one of the plurality of parallel computing units, wherein the state transition management unit further transmits a second state signal including second state information of the data path indicating second operation contents of the plurality of processor elements of the data path such that the plurality of processor elements of the data path is configured based on the second operation contents in the second state information of the data path, wherein the second state information is different from the first state information, wherein the plurality of processor elements of the data path that is configured based on the second state information generates second data, wherein, when the data path configured based on the first state information is reconfigured based on the second state information, the data path uses to the switch to reconfigure the data path from the first state information to the second state information, and wherein the state transition management unit is configured to fix the configuration of the data path over a plurality of cycles for inputting or outputting the data.

* * * * *